United States Patent
Khoryaev et al.

(10) Patent No.: US 10,779,189 B2
(45) Date of Patent: Sep. 15, 2020

(54) CONGESTION CONTROL FOR VEHICULAR-TO-ANYTHING SERVICES

(71) Applicant: Apple Inc., Cupertino, CA (US)

(72) Inventors: Alexey Khoryaev, Nizhny Novgorod (RU); Sergey Panteleev, Nizhny Novgorod (RU); Mikhail Shilov, Nizhny Novgorod (RU); Dmitry Belov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 15/754,531

(22) PCT Filed: Apr. 1, 2016

(86) PCT No.: PCT/US2016/025635
§ 371 (c)(1),
(2) Date: Feb. 22, 2018

(87) PCT Pub. No.: WO2017/052690
PCT Pub. Date: Mar. 30, 2017

(65) Prior Publication Data
US 2018/0242190 A1    Aug. 23, 2018

Related U.S. Application Data

(60) Provisional application No. 62/232,387, filed on Sep. 24, 2015.

(51) Int. Cl.
*H04W 28/02* (2009.01)
*H04L 12/823* (2013.01)
(Continued)

(52) U.S. Cl.
CPC ....... *H04W 28/0289* (2013.01); *H04L 47/283* (2013.01); *H04L 47/32* (2013.01);
(Continued)

(58) Field of Classification Search
None
See application file for complete search history.

(56) References Cited

U.S. PATENT DOCUMENTS

| 9,642,093 | B2* | 5/2017 | Festag | H04W 52/242 |
| 2015/0172956 | A1* | 6/2015 | Noh | H04W 74/0858 370/329 |

(Continued)

OTHER PUBLICATIONS

3GPP TR 22.885 V1.0.0 (Sep. 2015); "Technical Specification Group Services and System Aspects; Study on LTE Support for V2X Services (Release 14)," 42 pages.
(Continued)

*Primary Examiner* — Kenny S Lin
(74) *Attorney, Agent, or Firm* — Fish & Richardson P.C.

(57) ABSTRACT

Methods and apparatus for communicating in a wireless network supporting vehicle-to-anything (V2X) communication including a terminal comprising: transceiver circuitry to communicate via uplink and downlink radio interface with a radio access network of a wireless communication network and communicate directly via sidelink radio interface with one or more out of a vehicle terminal and/or a roadside unit; and control circuitry coupled to the transceiver circuitry to determine one or more indicator related to the apparatus and/or surrounding environment and control the transceiver circuitry to control communication over the sidelink radio interface based on the determined one or more indicator to control congestion on V2X spectrum resources.

21 Claims, 8 Drawing Sheets

(51) Int. Cl.
H04L 12/841 (2013.01)
H04W 4/40 (2018.01)
H04W 72/04 (2009.01)

(52) U.S. Cl.
CPC ......... H04W 4/40 (2018.02); H04W 28/0226 (2013.01); H04W 28/0284 (2013.01); H04W 72/0486 (2013.01)

(56) References Cited

U.S. PATENT DOCUMENTS

| 2016/0174122 | A1* | 6/2016 | Sorrentino | H04B 1/3822 370/331 |
|---|---|---|---|---|
| 2017/0223691 | A1* | 8/2017 | Jung | H04W 72/0406 |
| 2017/0230993 | A1* | 8/2017 | Lee | H04W 72/1215 |
| 2019/0182806 | A1* | 6/2019 | Chae | H04L 5/003 |

OTHER PUBLICATIONS

3GPP TR 22.885 V14.0.0 (Dec. 2015); "Technical Specification Group Services and System Aspects; Study on LTE support for Vehicle to Everything (V2X) services (Release 14)," 50 pages.
3GPP TR 23.785 V0.2.0 (Feb. 2016); "Technical Specification Group Services and System Aspects; Study on architecture enhancements for LTE support of V2X services (Release 14)," 21 pages.
3GPP TS 36.211 V12.6.0 (Jun. 2015); "Technical Specification Group Radio Access Network; Evolved Universal Terrestrial Radio Access (E-UTRA); Physical channels and modulation (Release 12)," 136 pages.
3GPP TS 36.211 V13.0.0 (Dec. 2015); "Technical Specification Group Radio Access Network; Evolved Universal Terrestrial Radio Access (E-UTRA); Physical channels and modulation (Release 13)," 141 pages.
3GPP TS 36.212 V12.5.0 (Jun. 2015); "Technical Specification Group Radio Access Network; Evolved Universal Terrestrial Radio Access (E-UTRA); Multiplexing and channel coding (Release 12)," 94 pages.
3GPP TS 36.212 V13.0.0 (Dec. 2015); "Technical Specification Group Radio Access Network; Evolved Universal Terrestrial Radio Access (E-UTRA); Multiplexing and channel coding (Release 13)," 121 pages.
3GPP TS 36.213 V12.6.0 (Jun. 2015); "Technical Specification Group Radio Access Network; Evolved Universal Terrestrial Radio Access (E-UTRA); Physical layer procedures (Release 12)," 241 pages.
3GPP TS 36.213 V13.0.1 (Jan. 2016); "Technical Specification Group Radio Access Network; Evolved Universal Terrestrial Radio Access (E-UTRA); Physical layer procedures (Release 13)," 326 pages.
3GPP TS 36.331 V12.6.0 (Jun. 2015); "Technical Specification Group Radio Access Network; Evolved Universal Terrestrial Radio Access (E-UTRA); Radio Resource Control (RRC); Protocol specification (Release 12)," 449 pages.
3GPP TS 36.331 V13.0.0 (Dec. 2015); "Technical Specification Group Radio Access Network; Evolved Universal Terrestrial Radio Access (E-UTRA); Radio Resource Control (RRC); Protocol specification (Release 13)," 507 pages.
International Search Report and Written Opinion for International Patent Application No. PCT/US2016/025635 dated Jun. 17, 2016; 14 pages.
ETSI TS 102 687 V1.1.1 (Jul. 2011); "Intelligent Transport Systems (ITS); Decentralized Congestion Control Mechanisms for Intelligent Transport Systems operating in the 5 GHz range; Access layer part;" F-06921; 45 pages.
Intel Corporation, Huawei, Hisilicon; "Use Case for MNO Configuration of V2X Message Transmission," Agenda Item: 8.4, 3GPP TSG-SA WG1 Meeting #71 S1-152079; Belgrade, Serbia, Aug. 17-21, 2015; 3 pages.
Kolios, et al.; "ExTraCT: Expediting Offloading Transfers Through Intervehicle Communication Transmissions," IEEE Transactions, vol. 16, No. 3, Jun. 2015; 11 pages.
KT Corp.; "V2X Use Case: Traffic Congestion Control/Warning," Agenda Item: 8.7; 3GPP TSG-SA WG1 Meeting #70, S1-151179; Los Cabos, Mexico, Apr. 13-17, 2015; 2 pages.
Samsung; "V2X deployment scenarios and vehicle density and mobility modeling," Agenda Item: 7.2.8.1.1, 3GPP. TSG RAN WG1 Meeting #82, R1-154188; Beijing, China, Aug. 24-28, 2015; 3 pages.
Subramanian, et al.; "Congestion Control for Vehicular Safety: Synchronous and Asynchronous MAC Algorithms," Jun. 25, 2012, New York, New York, USA; 10 pages.
Autolitano, et al.; "An Insight into Decentralized Congestion Control Techniques for VANETs from ETSI TS 102 687 V1.1.1," IEEE 2013 978-1-4799-0543-0; Nov. 1, 2013; 6 pages.
PCT International Preliminary Report on Patentability in International Appln. No. PCT/US2016/025635, dated Apr. 5, 2018, 9 pages.

* cited by examiner

CONGESTION CONTROL FOR VEHICULAR-TO-ANYTHING SERVICES

CROSS REFERENCE TO RELATED APPLICATIONS

The present application is a national phase entry under 35 U.S.C. § 371 of International Application No. PCT/US2016/025635, filed Apr. 1, 2016, entitled "CONGESTION CONTROL FOR VEHICULAR-TO-ANYTHING SERVICES", which claims priority to U.S. Provisional Patent Application No. 62/232,387, filed Sep. 24, 2015, entitled "CROSS-LAYER OPTIMIZATION FOR CONGESTION AVOIDANCE OF LTE BASED V2X SERVICES", the entire disclosures of which are hereby incorporated by reference in their entireties.

TECHNICAL FIELD

Embodiments described herein generally relate to wireless communications. More particularly, but not exclusively, embodiments described herein generally relate to methods and apparatus for a wireless communication network supporting vehicle-to-anything communication.

BACKGROUND

The automotive industry is undergoing changes as the desire for more automated services, active road safety and/or traffic management increases. Many vehicles are already connected to other devices via wireless networks and the information exchange between vehicles and between vehicles and other devices are used to improve services in the industry.

It has been proposed that information exchange between vehicles and between vehicles and other devices could be used to provide infotainment, provide warnings to drivers about potential risks, provide navigation assistance and improve traffic efficiency and reduce accidents.

Some intelligent transport system (ITS) applications such as active road safety and traffic management applications would use periodic and/or event-triggered transmission of messages carrying information about the vehicles and the surrounding environment such as vehicle location, vehicle speed, acceleration and different types of other control messages that may be used for operation of vehicular applications. Reliable delivery and the latency of the messages can be important for proper operation of the applications.

Legacy $3^{rd}$ Generation Partnership Project (3GPP) long-term evolution-advanced (LTE-A) networks such as an evolved universal mobile telecommunication system (UMTS) terrestrial radio access network (E-UTRAN) have limited support of vehicular services and are not optimized for vehicular services such as road safety or traffic management.

BRIEF DESCRIPTION OF THE DRAWINGS

Embodiments described herein are illustrated, without limitation, by way of example, in the accompanying drawings, in which.

DETAILED DESCRIPTION OF EMBODIMENTS

In the following detailed description, the same reference numbers may be used in different drawings to identify the same or similar elements. Numbers provided in flow charts and processes are provided for clarity in illustrating operations and do not necessarily indicate a particular order or sequence. In certain instances, descriptions of well-known devices, circuits, and methods are omitted so as not to obscure the description of the embodiments with unnecessary detail.

Figure 1:
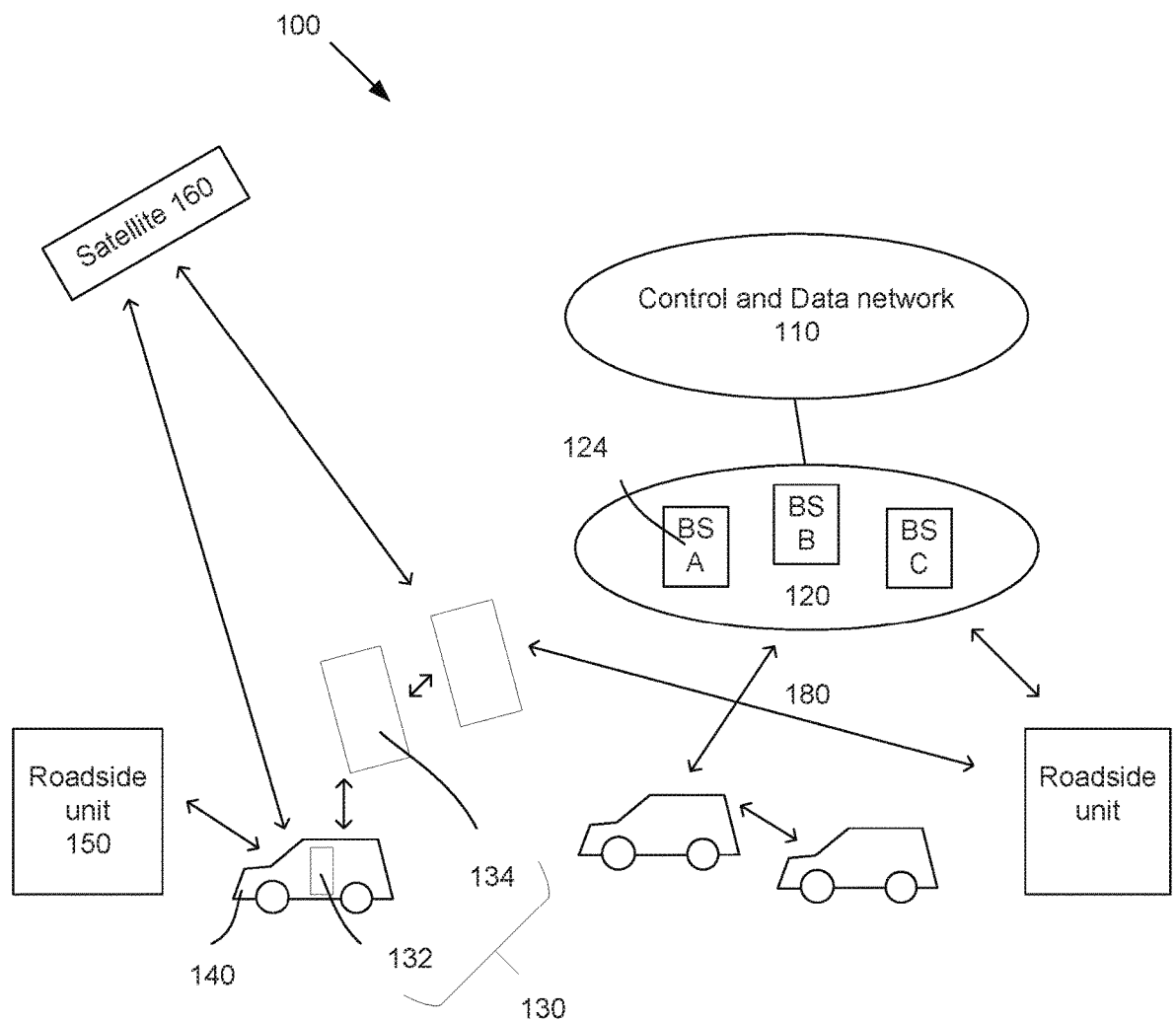
FIG. 1 is schematic block diagram of a wireless communications network.

FIG. 1 schematically illustrate a wireless communication network 100 enabling vehicular-to-anything (V2X) communication, including, but not limited to, vehicular-to-vehicular (V2V), vehicle-to-infrastructure (V2I), vehicle-to-network (V2B) and vehicle-to-pedestrian (V2P) communication. The network 100 comprises a control and data network 110, a radio access network (RAN) 120 and a plurality of user equipment (UEs) 130 at least some of which are also subscriber devices subscribing to V2X services. The UEs comprises terminals 132 pre-installed in vehicles 140. The vehicle terminals are subscriber devices subscribing to V2X services. V2V communication includes direct communication between subscribing vehicle terminals. The UEs may also comprise portable terminals 134, such as mobile devices, for example carried by pedestrians, cyclists, drivers or passengers. At least some of the portable devices may also be subscriber devices subscribing to V2X services. V2P communication includes direct communication between subscribing vehicle terminals and subscribing terminals carried by pedestrians. The radio access network 120 comprises a plurality of base stations 124. The base stations may be in the form of evolved node base stations (eNodeBs or eNBs).

The network also comprise roadside units 150 (RSUs) for supporting V2X services. In some embodiments, the roadside units may be UE-type RSUs. In other embodiments, the roadside units may be eNB-type RSU and form part of the RAN 120. In some implementations, the network may comprise both UE-type RSUs and eNB-type RSUs. V2I communication may include direct communication between a subscribing vehicle terminal and a UE-type RSU or communication between a subscribing vehicle terminal and an eNB.

The network may also comprise a plurality of Global Navigation Satellite Systems (GNSS) 160 used for synchronization and geo-location of network nodes.

Parts of the network form a 3$^{rd}$ Generation Partnership Project (3GPP) radio network supporting device-to-device (D2D) communication between UEs. The D2D communication between the UEs may be provided using a sidelink radio interface. The UEs may communicate with the radio access network 120 using uplink and downlink radio interface supported by the RAN 120. The uplink and downlink radio interface may be a Uu air-interface. Specifically, the wireless communication network 100 may provide an access network of a 3GPP long-term evolution (LTE), long-term evolution-advanced (LTE-A) or long term evolution advanced pro (LTE-A-Pro) network such as an evolved universal mobile telecommunication system (UMTS) terrestrial radio access network (E-UTRAN), with proximity services (ProSe). As will be known by the skilled person, ProSe allows UEs within communication range to discover and communicate with each other. The sidelink provides a direct radio link between the subscriber devices to enable V2V and some other types of V2X communication between the subscriber devices. The UEs can communicate directly with each other irrespective of whether the UEs are within our outside coverage of the RAN.

The network may provide access to a V2X control function that may be within the 3GPP network and/or to a V2X application server that may be located outside of the 3GPP network and provide certain services for an intelligent transport system (ITS) formed by at least parts of the network. The network may be configured to enable communication between components to reduce collision problems with respect to signaling in the network and to improve its reliability and performance of V2X communication. Different applications may use the system differently. Some applications may, for example, provide active road safety, provide traffic management applications and/or enable autonomous driving. They may for example provide assistance to vehicles to avoid accidents and/or to find routes without traffic jams.

The control and data network 110 may comprise an evolved packet core (EPC) and an operator packet data network. The control and data network 110 may also comprises the V2X control function and the V2X application server. V2N communication may include communication between subscribing vehicle terminals and the V2X control function and the V2X application server. The EPC may comprise a mobility management entity (MME), a serving gateway (S-GW), a packet data network gateway (P-GW) and a home subscriber server (HSS). The EPC may also comprise a Secure User Plane Location (SUPL) Location Platform (SPL) to support Location-Based Services (LBS) and the V2X control function. The components of an EPC will be known by the skilled person and will not be described herein. The EPC may be connected to external networks including but not limited to an IP multimedia core network subsystem (IMS) and the internet.

In FIG. 1, three base stations BS A, BS B and BS C, are shown. They may be fixed or mobile stations/nodes. As mentioned above, the base stations may be eNBs. The eNBs are configured to wirelessly communicate with the UEs using radio-signals 180. The network 100 provides radio service coverage over a number of cells formed by the eNB(s). A UE, within a cell, connects to an associated eNB and receives and transmits data, including voice data, from and to the network via the eNB to which it is connected. The eNBs also control the ProSe and vehicular services between the UEs that are subscribed devices. The eNBs may control the vehicular services based on information and commands from the V2X application server or the V2X control function residing in the control and data network 110. They may communicate directly with the vehicle terminals.

The subscriber devices and UE-type roadside units will in some descriptions of embodiments hereinafter be referred to as V2X users.

During operation of the wireless network 100, a UE 130 may move through the area covered by the network. For example, when a UE is within the cell area associated with eNB A, the UE will transmit and receive signals to and from the network via that eNB A. Subsequently, the UE may move to a different position outside of the cell area associated with eNB A, but within the area covered by eNB B. As the UE moves from the first position to the second position, a handover procedure will be initiated such that the UE's connection to the wireless network 100 is via signals transmitted and received to and from the eNB B. Two or more of the eNBs may cover overlapping cell areas such that a UE in the cell area can communicate with two or more eNBs. The eNB that a UE is connected to is referred to as the serving base station for that UE.

Parts of the network 100 may be used by a plurality of wireless network operators (MNOs). Some of the infrastructure provided by the network may be used by only one operator and some of the infrastructure, for example some of the eNBs, may be shared by operators. Each operator controls its own public land mobile network (PLMN) which may or may not share RAN infrastructure with another PLMN. Each UE has a home PLMN (HPLMN), which is the PLMN in which the user's subscriber profile is held. However, when the UE is outside the coverage of the HPLMN, the UE may connect to a PLMN provided by another operator. This is known as roaming. For example, if the HPLMN of an UE does not have access to, for example, eNB A and eNB C, the UE may need to roam if it moves away from the cell area covered by eNB B into a cell area covered by eNB A or eNB C. The V2X services may be provided by the MNO or a dedicated ITS service providers.

Figure 2:
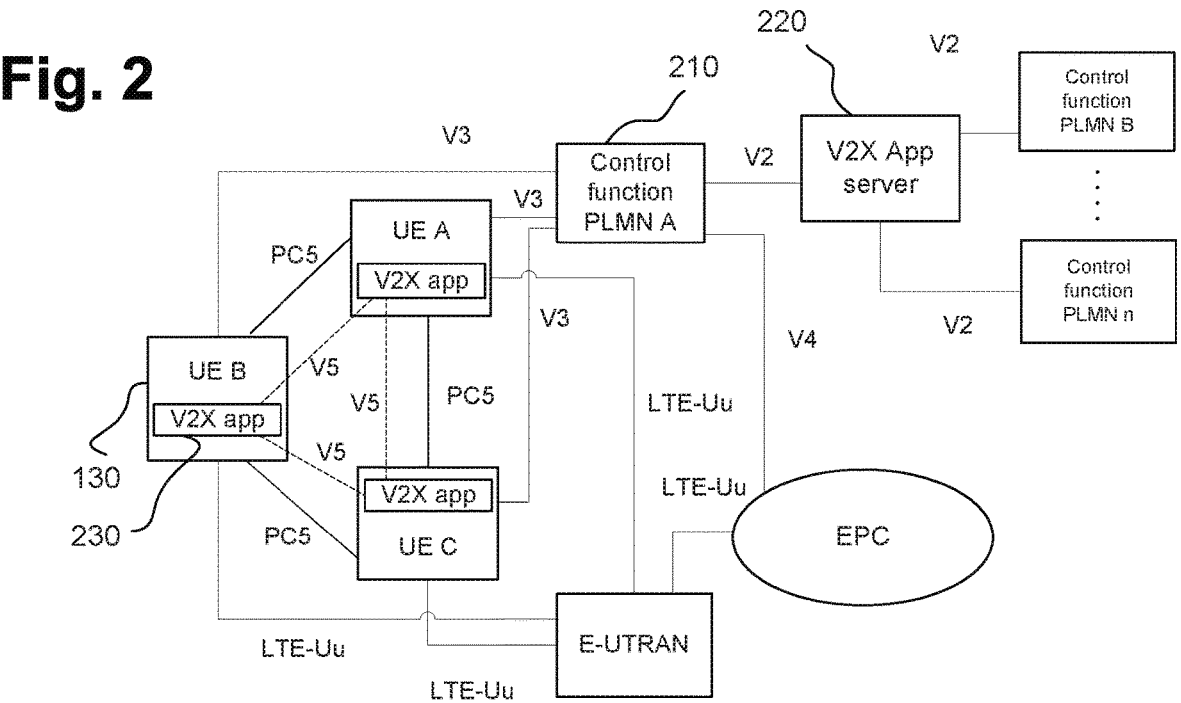
FIG. 2 is a schematic block diagram of parts of the network of FIG. 1.

The interfaces for sidelink and radio access network communication will be described in more detail with respect to FIG. 2 which shows one example of an implementation of parts of the network of FIG. 1. In FIG. 2, a V2X control function 210 and a V2X application server 220, forming part of the data and control network 110 of FIG. 1, are shown. The V2X application server comprises a V2X server for controlling the V2X communication. As mentioned above, the V2X server may in some implementations be located outside the 3GPP network. The network may comprise a separate V2X control function for each PLMN. The V2X control functions communicate with the V2X server via an interface V2. As shown in FIG. 2, in some implementations, a single V2X server serves a number of PLMNs. It may for example be operated by a V2X service provider separate from the MNOs associated with the PLMNs. In other implementations, the network may comprise more than one V2X server and at least some PLMNs may have its own V2X server. FIG. 2 also shows components of the EPC forming part of the data and control network of FIG. 1 and how the V2X control functions communicate with the EPC via an interface V4.

FIG. 2 further shows three UEs 130 forming subscriber devices of V2X services. The three UEs may for example comprise two vehicle terminals and a pedestrian portable device or a stationary UE-type RSU. Each UE comprises a V2X application (APP) 230 for enabling the UEs to participate in V2X communication. The UEs communicates with the E-UTRAN via a LTE-Uu air interface. The UEs transmit in uplink frequency channels or time periods allocated for the uplink and receive from the E-UTRAN in downlink frequency channels or time periods allocated to the downlink, depending on whether frequency division duplex (FDD) or time division duplex (TDD) is used. The UEs also communicate directly with each other via a sidelink provided by an LTE PC5 air interface. The V2X applications of the UEs communicate with each other via a V5 interface. The UEs also communicate with the V2X control function in their HPLMN via an interface V3.

It will be appreciated that FIG. 2 only shows one implementation and interfaces may be different or may be labelled differently in other implementations. For example, the uplink and downlink radio interface may not be an LTE-Uu air interface in other implementations. Moreover, the sidelink interface may not be a PC5 air interface in other implementations.

The network may allocate sidelink resources to the UEs. Alternatively, the UEs may be configured to select resources from a preconfigured resource pool. The sidelink communication may take place within frequency spectrum resources or time resources allocated to the uplink. As an example, in one TDD implementation, the network may allocate the UEs specific uplink subframes for sidelink communication. Alternatively, it may take place within frequency spectrum resources or time resources specifically dedicated to sidelink communication (e.g. a dedicated carrier). As one specific example, the sidelink communication may take place in dedicated channels allocated for ITS communication, for example the 5.9 gigahertz (GHz) ITS band.

The network may provide signaling to provide synchronization and common timing reference for the sidelink radio interface. This may for example include providing a common timing reference across a wide geographical area using network timing reference or global navigation satellite system (GNSS) synchronization. It may for example also include enhancement to resource allocation by dividing spectrum resources on slotted time intervals for transmission of predefined duration. Additionally, it may include allocation of common and aligned functional time intervals for transmission of different channel or information types (control commands, data, etc.). It may also include synchronized multi-channel operation across multiple bands (for example operation over multiple channels in 5.9 gigahertz (GHz) band) using common cellular reference carrier. It will be appreciated that the synchronization and common timing reference for the sidelink may include some but not all of the above mentioned measures.

Messages sent in the sidelink may be broadcast, multicast or unicast. In some implementations or examples, all subscriber devices in the proximity can receive and decode the messages. The sidelink messages may include the identity (ID) of the transmitting device. When the radio access network is an LTE network, the identity may be the LTE layer 1 (L1) or layer 2 (L2) identity for the UE that may be derived from a unique identifier for the UE.

In implementations wherein the roadside units in the network are based on UE, the roadside units would communicate with other UEs using LTE PC5 air interface. In the implementations wherein the roadside unit is an eNB-type RSU, the roadside units would communication with UEs using the LTE Uu air-interface.

FIG. 2 shows signaling within a single PLMN, expect for the V2X control functions of other PLMNs. The signaling in FIG. 2 applies when the UEs communicating via a sidelink have the same HPLMN. If the UEs have different HPLMNs, each PLMN may have its own EPC and its own V2X control function connected to the V2X application server. For example, if the HPLMN of UE A is PLMN A and the HPLMN of UE B is PLMN B, UE A will communicate, via interface V3, with the V2X control function in PLMN A which will communicate via interface V2 and the V2X application server with the V2X control function in PLMN B to set up the sidelink communication between the UE A and UE B. Moreover, if for example UE A is roaming in PLMN C, UE A will communicate via V3 to the V2X control function in its HPLMN, PLMN A, which in turn would communicate with the V2X control function of the serving network PLMN C to set up the sidelink communication for UE A with another UE.

The skilled person would know how V2X functionality in LTE networks works and the interfaces and protocols will not be described in detail herein.

Further information about the interfaces, protocols and network components that could be used to implement the networks and mechanisms described herein can be found in for example, but not limited to, 3GPP technical specification TS 36.211 V12.6.0 (2015-06) and V13.0.0 (2015-12), technical specification TS 36.212 V12.5.0 (2015-06) and V13.0.0 (2015-12), technical specification TS 36.213 V12.6.0 (2015-06) and V13.0.1 (2016-01), technical specification TS 36.331 V12.6.0 (2015-06) and V13.0.0 (2015-12), technical report TR 22.885 V1.0.0 (2015-09) and V14.0.0 (2015-12), and/or technical report TR 23.785 V0.2.0 (2016-02).

To provide active road safety and/or traffic management services the system enables periodic and/or event-triggered transmission of messages carrying information about the vehicles and the surrounding environment. For example, a vehicle may send information associated with the vehicle such as vehicle location, vehicle speed and/or acceleration. The vehicle may also send event information such as information about road works, traffic jams and ice or fog. The system also enables different types of other control messages that may be used for operation of vehicular applications.

The typical traffic pattern generated by road safety applications is represented by periodical messages of up to $N_{V2X}$ bytes size where $N_{V2X}$ may vary in the range from 50 bytes to 1200 bytes depending on upper layers protocols and applications but typically described by the size of $N_{V2X}=190$ bytes or $N_{V2X}=300$ bytes. These messages are supposed to be delivered to the neighborhood entities (subscribers of V2X services (V2X users), including but not limited to vehicles, pedestrians and/or roadside units). The messages may also be supposed to be delivered to eNBs. For proper operation of the vehicular applications, the reliable delivery of the messages within a predefined effective range is important in V2X systems. As an example, in some V2X systems, this may mean a delivery to $X_{V2X}=90\%$ of V2X users within a range of $R_{V2X}=300$ m). Moreover, latency of message delivery is also important in some systems given that broadcasted information may become outdated, if it is not delivered within a predefined time interval. Typically, it may be desired that the latency ($L_{V2X}$) for V2V road safety applications is not more than 100 ms, but it may vary depending on application, environment and message content (i.e. system may tolerate larger latencies, but still operate properly).

Given the periodical transmission nature of the V2X traffic, the V2V system performance may significantly depend on the amount of V2X users in the neighborhood (vehicles, pedestrians, roadside units, or other entities participating in V2X service). For instance, under assumption of limited amount of allocated spectrum resources in dense environment it may happen that system performance may degrade substantially due to frequent collisions of messages and congestions leading to severe interference environment.

LTE technology may provide unique advantages to the V2X services due to availability of the network infrastructure and locally deployed centralized nodes that may provide assistance or control signaling to V2X users and control the congestion environment in different geographic regions. Further, embodiments relate to techniques that can be applied in LTE based V2X system to dramatically improve the V2X service performance. The unique combination of the listed below techniques may provide significant improvement of LTE based V2X services in terms of reliability for varying densities of served V2X users.

The vehicles or other UEs may be configured to use LTE technology to receive and transmit additional information as will be described in more detail below in order to reduce the congestion and collision problems in the system and improve its reliability. In more detail, the network shown in FIG. 1 is configured to establish congestion conditions and react to the conditions to control congestion on V2X spectrum resources. It may control congestion by for example adjusting transmission parameters or behavior of the subscribers. For example the vehicle terminals and other UEs may be configured to obtain indicators indicating the congestion condition in the sidelink or indicating information about the vehicle or the UEs and dynamically change their behavior and/or transmission settings, including for example stored transmission resource parameters or transmission behavior, in dependence on the determined indicators and stored data or data received from the network in response to sending the indicators to the network. In some embodiments they may transmit the indicators to the network and receive commands, in response, to change their behavior from the network. In other embodiments, they will be pre-configured by the network to compare the indicators to pre-configured criteria to adjust their behavior. In yet other embodiments, a UE may be configured to dynamically change its behavior based on a comparison of one or more determined indicators to stored parameters and based on instructions from the network in response to sending one or more other determined indicators to the network. In some examples the behavior of the UE may be adjusted by adjusting transmission settings of the UE.

The vehicles may communicate with roadside users for example to obtain information about the area in which the roadside units are located. Roadside units may for example broadcast information about traffic lights or nearby road works. They may alternatively provide autonomous tolling services or autonomous driving services. Roadside units may also be used to detect indicators indicating congestion conditions. When the roadside users are configured to communicate over a sidelink radio interface they may also react to the conditions to control congestion on V2X spectrum resources. For example the roadside units may be configured to obtain indicators indicating the congestion condition in the sidelink or indicating information about the roadside unit and dynamically change its behavior in dependence on the determined indicators and stored data or data received from the network in response to sending the indicators to the network. When the roadside unit is an eNB-type RSU, the roadside unit may be configured to receive, from vehicles and/or other UEs, indicators of the congestion condition in an area and transmit commands for controlling congestion on V2X spectrum resources to the UEs.

Portable devices in the network may also be configured to detect indicators associated with the devices or the congestion condition in the area in which the portable devices are located. They may also react to the conditions to control congestion on V2X spectrum resources. For example the portable devices may be configured to obtain indicators indicating the congestion condition in the sidelink or indicating information about the devices and dynamically change their behavior in dependence on the determined indicators and stored data or data received from the network in response to sending the indicators to the network. The portable devices may communicate with the vehicles to share for example their location, velocity and acceleration.

The arrangement and processes of the network 100, and specifically the eNBs and the UEs, for detecting congestion conditions or other information about V2X subscribers and controlling congestion on V2X spectrum resources will be described in more detail with respect to FIGS. 5 to 11. Firstly, the components of the eNodeB and the UE will be described with respect to FIGS. 3 and 4.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 3:
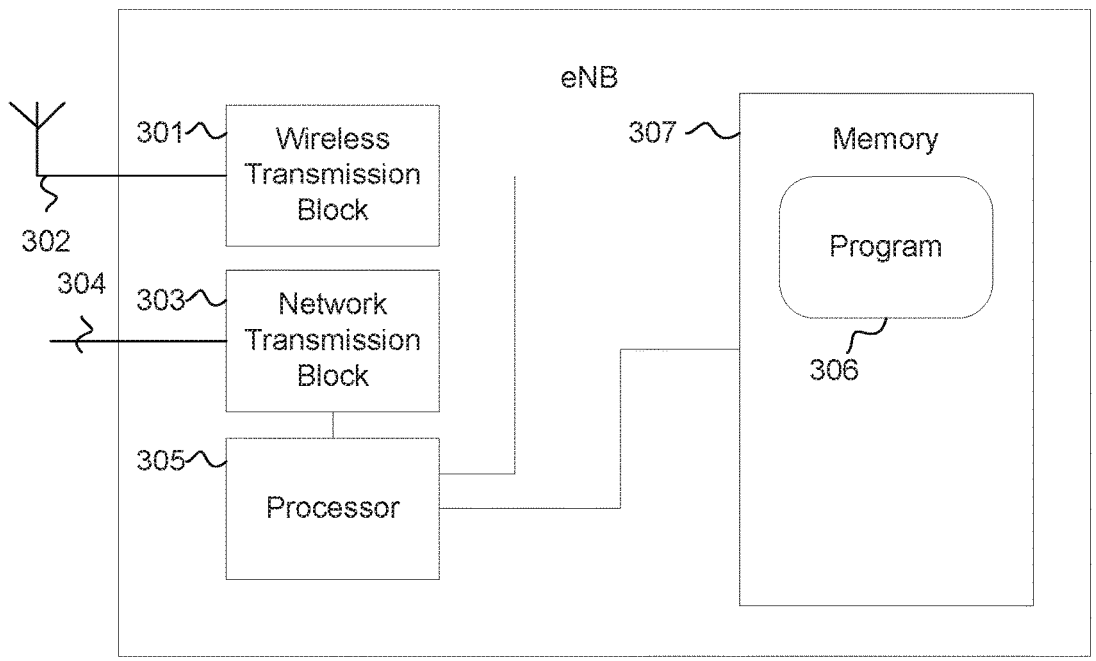
FIG. 3 is schematic block diagram illustrating a base station in the network.

FIG. 3 illustrates for one embodiment, example components of an eNB, for example, base station BS A in FIG. 1. The eNB comprises a wireless transmission block 301 for communicating wirelessly with UEs such as, for example, the vehicle terminals, and portable devices described with respect to FIG. 1. When the roadside units 150 are based on UE technology, the eNB may also use the wireless transmission block 301 for communicating wirelessly with the roadside units. The transmission block 301 has an associated antenna 302 and may have a number of antennas for multiple-input and multiple-output (MIMO) operation. A network transmission block 303 may be provided, which supports network communications such as communication with the control and data network 110 and, for example, backhaul communications with other eNBs such as base station BS B and BS C, or any other network entity. The eNB can comprise, therefore, a network connection 304 such as, for example, the communication link with the control and data network 110 and its components described above. A processor 305 is provided for controlling overall operations of the eNB. The processor 305 can comprise a number of processors, and/or one or more multi-core processors. The processor 305 operates in accordance with software 306 stored within a processor readable, or processor accessible, memory or storage 307. The software 306 is arranged so that the eNB can implement the examples described herein, and, in particular, can implement the eNB aspects of the flowcharts and flow diagrams described herein. The memory 307 may store data and software defining routines for implementing sensing, inter-cell interference coordination (ICIC), mobility, access control, radio resource management (RRM) and scheduler functions. The memory 307 may also comprise elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. The memory/storage may include any combination of suitable volatile memory and/or non-volatile memory.

In some implementations, the network of FIG. 1 may comprise at least one eNB as described with respect to FIG. 3 implemented as a roadside unit.

Figure 4:
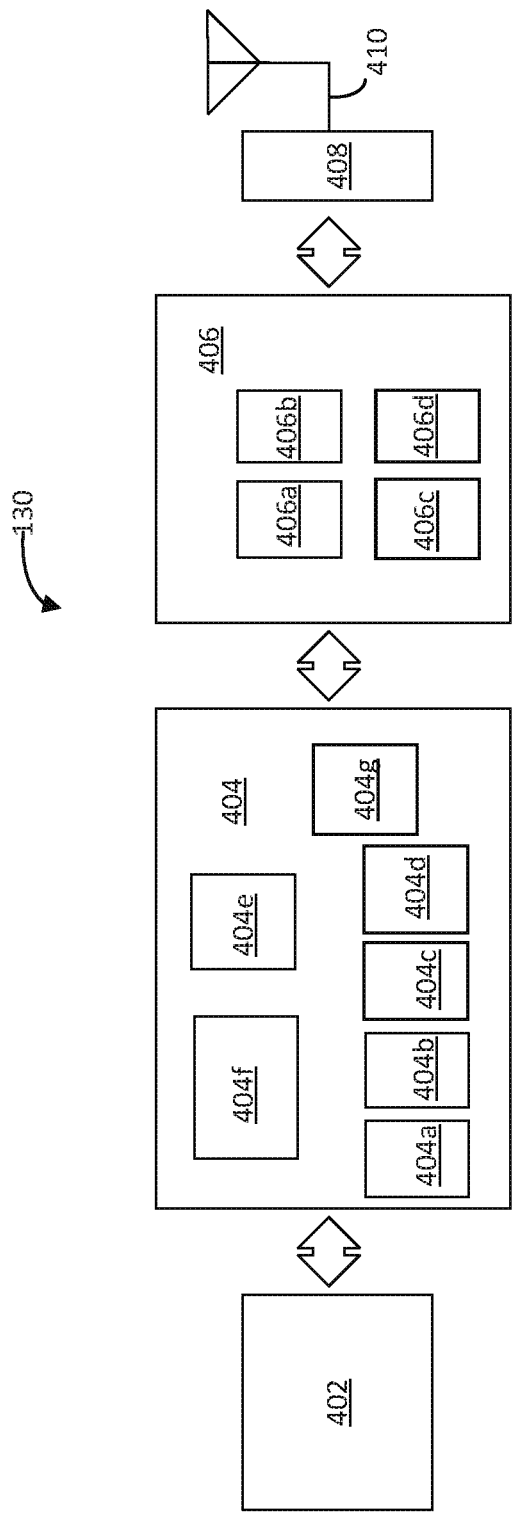
FIG. 4 is a schematic block diagram illustrating a user equipment (UE) in the network.

FIG. 4 illustrates, for one embodiment, example components of an electronic device. In embodiments, the electronic device may be, implement, be incorporated into, or otherwise be a part of a UE, an evolved NodeB (eNB), an electronic device with V2X or V2V functionality, or some other electronic device. It may, for example, be a vehicle terminal 132, portable device 134 or roadside unit 150 of FIG. 1. In some embodiments, the electronic device may include application circuitry 402, baseband circuitry 404, radio frequency (RF) circuitry 406, front-end module (FEM) circuitry 408 and one or more antennas 410, coupled together at least as shown.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuity 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may include elements for compression/decompression and echo cancellation and may include other suitable processing elements in other embodiments.

The baseband circuitry 404 may further include memory/storage 404g. The memory/storage 404g may be used to load and store data and/or instructions for operations performed by the processors of the baseband circuitry 404. Memory/storage for one embodiment may include any combination of suitable volatile memory and/or non-volatile memory. The memory/storage 404g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 404g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406*d*. The amplifier circuitry 406*b* may be configured to amplify the down-converted signals and the filter circuitry 406*c* may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406*a* of the receive signal path may comprise passive mixers, although the scope of the embodiments is not limited in this respect.

In some embodiments, the mixer circuitry 406*a* of the transmit signal path may be configured to up-convert input baseband signals based on the synthesized frequency provided by the synthesizer circuitry 406*d* to generate RF output signals for the FEM circuitry 408. The baseband signals may be provided by the baseband circuitry 404 and may be filtered by filter circuitry 406*c*. The filter circuitry 406*c* may include a low-pass filter (LPF), although the scope of the embodiments is not limited in this respect.

In some embodiments, the mixer circuitry 406*a* of the receive signal path and the mixer circuitry 406*a* of the transmit signal path may include two or more mixers and may be arranged for quadrature downconversion and/or upconversion respectively. In some embodiments, the mixer circuitry 406*a* of the receive signal path and the mixer circuitry 406*a* of the transmit signal path may include two or more mixers and may be arranged for image rejection (e.g., Hartley image rejection). In some embodiments, the mixer circuitry 406*a* of the receive signal path and the mixer circuitry 406*a* may be arranged for direct downconversion and/or direct upconversion, respectively. In some embodiments, the mixer circuitry 406*a* of the receive signal path and the mixer circuitry 406*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406*d* may be a fractional-N synthesizer or a fractional N/N+1 synthesizer, although the scope of the embodiments is not limited in this respect as other types of frequency synthesizers may be suitable. For example, synthesizer circuitry 406*d* may be a delta-sigma synthesizer, a frequency multiplier, or a synthesizer comprising a phase-locked loop with a frequency divider.

The synthesizer circuitry 406*d* may be configured to synthesize an output frequency for use by the mixer circuitry 406*a* of the RF circuitry 406 based on a frequency input and a divider control input. In some embodiments, the synthesizer circuitry 406*d* may be a fractional N/N+1 synthesizer.

In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406*d* of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410.

In some embodiments, the electronic device 130 may include additional elements such as, for example, memory/storage, display, camera, sensor, and/or input/output (I/O) interface.

When the electronic device of FIG. 4 is an UE including a vehicle terminal or other device subscribing to V2X services, the circuitry may be operable to communicate with an eNB via an uplink and downlink radio interface and with other UEs via a sidelink interface. Moreover, the circuitry is configured to transmit and receive over a sidelink. When the sidelink communication is carried out on dedicated spectrum, the mixer circuitry 406a and the synthesizer circuitry 406d of the RF circuitry 406 may be operable to generate a signal at the frequency of the dedicated spectrum.

In some embodiments, the electronic device of FIG. 4 may be configured to perform one or more methods, processes, and/or techniques as described herein, or portions thereof. The electronic device may implement the examples described herein, and, in particular, can implement the UE aspects of the flowcharts and flow diagrams described herein.

In some implementations, the network of FIG. 1 may comprise at least one UE as described with respect to FIG. 4 implemented as a roadside unit.

Although an embodiment of an eNB has been described with respect to FIG. 3 and an embodiment of a UE has been described with respect to FIG. 4, FIG. 4 may alternatively illustrate, for one embodiment, example components of an eNB or some other electronic device in the system 100.

Embodiments to enabling mechanisms to detect congestion and react on congestion condition by adjusting transmission parameters or behavior of V2X users will now be described in more detail. Two mechanisms may be included in various embodiments:
1) network controlled mode (Mode-1), where eNB or road side unit (based on eNB or UE design) provides additional V2X control signaling to adjust parameters of V2X transmissions in order to ensure that application performance criteria (e.g. reliability, latency, etc.) is satisfied and
2) autonomous operation mode that aims to resolve the same problems following pre-defined/pre-specified rules. The described mechanisms can be considered as a cross layer optimization techniques that act across multiple layers including layer 1/layer 2/layer 3 (L1/L2/L3) and above (e.g. application layers) in order to ensure that V2V system operates properly.

Legacy LTE networks have limited support of vehicular services and are not optimized for vehicular services such as road safety or traffic management. Therefore, the content described here can be considered as a set of new processes or techniques to optimize LTE technology for V2X services. Recent work in the LTE release 12 enabled the basic support of proximity services including direct communication and discovery between terminals (UEs). The integrated frameworks in combination with LTE network infrastructure capabilities may be used to significantly improve V2X services and in future enable the vision of "connected car" and autonomous driving concepts, while the early LTE based V2X frameworks may be focused on road-safety, traffic management and infotainment applications.

The LTE protocol stacks used by the UE and/or eNB are divided into a number of system operation layers and the different layers, as will be known by the person skilled in the art, are referred to in places herein to describe examples of how processes, mechanisms and techniques can be implemented. However, it will be appreciated that other implementations are possible and corresponding layers and protocols in future 3GPP networks may be used in implementations based on those future 3GPP networks. Moreover, examples of computer program instructions and data stored in memory of the UE and the eNB will be described with respect to FIG. 5 to illustrate how some processes, mechanisms and techniques can be implemented. However, it will be appreciated that these are just examples and other implementations and alternatively arrangements of data and instructions are contemplated.

Congestion Condition/Criteria and Congestion Indicators

In order to control V2V users' transmitter parameters or behavior it may be desired that the congestion condition is specified. This condition may be defined at different system operation layers, e.g. layer 1, layer 2, layer 3 (L1, L2, L3) or application layer or their combination. The congestion condition/criteria may comprise multiple congestion indicators that may form, or be input to, a congestion function which output value may be compared with pre-configured thresholds or used in other ways to determine how to control communication on sidelink to control congestion. The congestion function can be defined in both network controlled and autonomous modes of operation in order to mitigate the congestion issue. The single or multiple congestion functions can be defined and operate across multiple layers such L1-congestion control, L2-congestion control, L3-congestion control or application layer congestion control functions.

Figure 5:
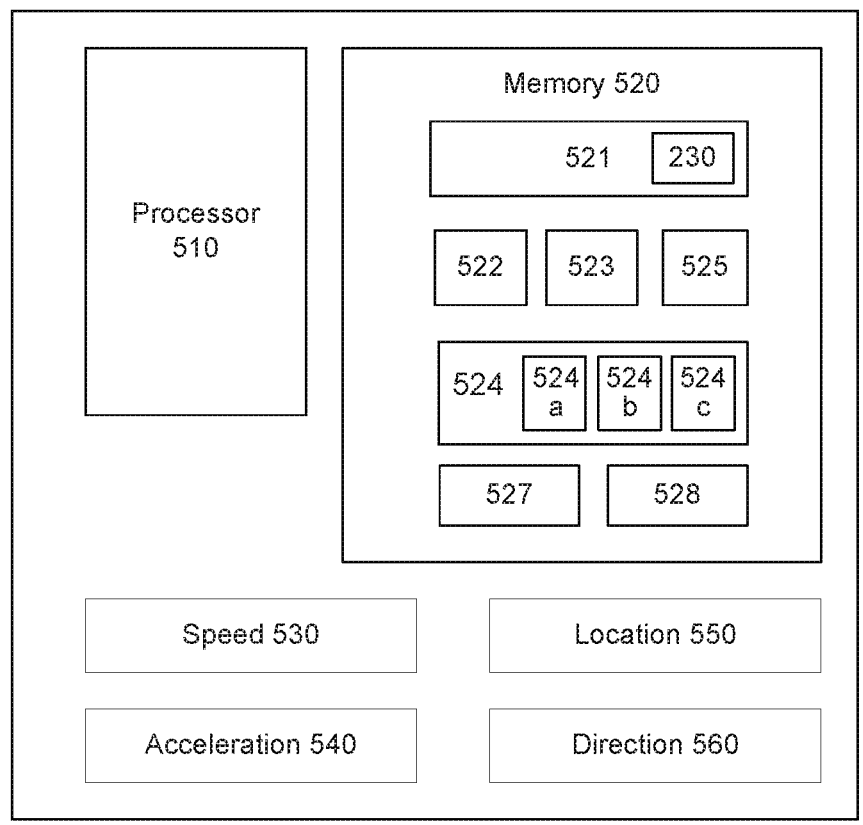
FIG. 5 is a schematic block diagram illustrating some parts of the UE in more detail.

In more detail, with reference to FIG. 5, circuitry 500 of a vehicle terminal or other UE is shown. FIG. 5 provides another schematic view of selected parts of the UE. The circuitry comprising processing circuitry 510 and memory 520 for storing data and programs for implementing some of the processes and mechanisms according to embodiments described herein is schematically shown.

The processing circuitry 510 may, for example, comprise one or more of the processors of the application circuitry 402 and one or more of the processors 404a to 404f of the baseband circuitry 404 of FIG. 4. The memory 520 may, for example, comprise some of the memory or storage in the application circuitry 402 and some of the memory or storage 404g of the baseband circuitry 404. The memory may include any combination of suitable volatile memory and/or non-volatile memory, including, but not limited to, read-only memory (ROM), random access memory, cache, buffers, etc. The memory may be shared among various processors of the processing circuitry or dedicated to particular processors. The processing circuitry 510 is coupled to, and can control, transceiver circuitry (not shown in FIG. 5) provided by the RF circuitry 406 and FEM circuitry 408 shown in FIG. 4. The transceiver circuitry may also include parts of the baseband circuitry and application circuitry of FIG. 4.

The memory 520 may store a plurality of applications 521, including the V2X application 230. Data may be transmitted by the application via the baseband circuitry 404, RF circuitry 406, FEM circuitry 408 and the antenna 410 to the eNB or another V2X user device. Correspondingly, data for the application may be received from the eNB 120 by or other V2X users via the antenna 410 and passed to the application via the FEM circuitry 408, RF circuitry 406 and baseband circuitry 404. The memory may further store congestion control configuration data 522, measured congestion indicators 523 and congestion criteria 524, including indicator thresholds 524a, other congestion threshold values 524b and congestion condition functions. The memory may also store indicators 525 about the UE such as location information, velocity information and acceleration information. The location information may comprise an ID for the geographical area in which the UE is located. The velocity information may comprise a velocity vector.

The congestion control configuration data 522 may include a list of measurements and other indicators to be obtained by the UE and information for carrying out the measurements and/or obtain the other indicators. The congestion criteria 524 may store data for evaluating the obtained indicators. The indicator thresholds 524a and other threshold values 524b may be used to compare obtained indicators against. In some implementations, a number of indicators may need to be considered together and a congestion condition function of the stored congestion condition function functions 524c may be provided to take a number of indicators as input and to provide an output, representing a congestion condition, that can be compared to the threshold values 524b or used in other ways to control congestion on V2X spectrum resources. In some implementations, some but not all of these values are stored in memory.

The circuitry 500 may also comprise sensors 530 for obtaining the speed and sensors 540 for obtaining the acceleration of the UE. Additionally the circuitry may comprise circuitry 550 for obtaining the location of the UE. The circuitry may comprise circuitry for receiving and processing signals from GNSS. Alternatively or additional, when the UE is not a roadside unit it may comprise circuitry for receiving location information from a nearby roadside units or eNBs (network). The circuitry may also comprise sensors 560, such as accelerometers for determining the direction of travel. When the UE is a vehicle terminal, the sensors 530, 540, 550, 560 may be located within the vehicle terminal 132 or one or more of them may be located outside the terminal in the vehicle but may be coupled to the terminal.

The following congestion indicators may be used in V2X system to monitor congestion environment:

a. Information on amount of active V2X users. Information about number of detected V2X users/transmitters (detected at L1 or L2 or upper layers, etc) observed in the given geographical region over predefined or configured time-interval can be collected by the V2X users and reported to the requesting entity such as L2 control functions, eNB, a V2X control function network server and/or the V2X application server so that appropriate actions (congestion avoidance mechanism) are triggered at the corresponding layers. The information about the amount of active V2X users may be collected by V2X users by processing sidelink control, shared or discovery channels such as the physical sidelink control channel (PSCCH), the physical sidelink shared channel (PSSCH) or physical downlink shared channel (PS-DCH) or new sidelink channels designed/optimized specifically for V2X communication. For example, in some implementations, the congestion control configuration data 522 may specify the time period and the type of channels, e.g. the frequency of the channels, in which the number of active V2X users should be monitored. The UE may determine the number of active users by counting the number of different identities in sidelink message received over the time period in the relevant channels. In some implementations, the UE may calculate the average number of active users over a number of time periods.

b. Information on Receive Power Level and Spectrum Utilization Indicators. The received power measurements can be used as indicators of medium activity. In case if this metric is used V2X user may be configured with the predefined subsets of time (e.g. set/subset of subframes) and frequency (e.g. set/subset of physical resource block (PRBs)) resources where UE performs measurement of received power indicators comprising either a sidelink received signal strength indicator (SL-RSSI), sidelink reference signal received power (SL-RSRP) or sidelink reference signal received quality (SL-RSRQ). This information can be used as an argument of the congestion condition function to estimate the congestion level on the predetermined set/subsets of V2X resources used for V2X communication. The simple example in this case is to define different sets of subframes and measure average received power for each subframe set at certain time intervals. This information can be used to coarsely estimate the resource utilization level or even estimate the average range between UEs (e.g. if SL-RSRP measurement under known transmission (TX) power is analyzed). The type of measurement and the time and frequency resources in which to perform the measurement may be configured in the congestion control configuration data 522 in memory. In some implementations, for example a processor of the baseband circuitry 404 or the application circuitry 402 may control the RF circuitry 406 and FEM circuitry 408 to measure for example the power in a pre-configured frequency channel over a pre-configured time. The measurements may be conducted periodically in order to estimate the statistical properties over a given time interval such as a mean value, a standard deviation or a certain probability that reception (RX) power is above a certain level or that analyzed spectrum resources are occupied. The measurements may be used to provide spectrum resource utilization metrics, including for example percentage of utilized sidelink control resources, percentage of utilized sidelink shared resources and corresponding measurements where the level of utilization may be associated with received power level measurement. The spectrum utilization metrics may be collected according to geo-information. For example, UEs in a particular geographical area or having other associated geo-information may be instructed to obtain the metrics.

c. Information about vehicle parameters. The vehicle speed may be an indirect indicator of the congestion condition. In high-speed scenarios the inter-vehicle distance is typically larger and thus the congestion may not be as high comparing to the case when average vehicle speed is low. On the other hand, in high-speed scenario the minimum safety distance also increases which may require increased communication range. In this case, the control entity may decide to either increase the communication range by applying mechanism that leads to increased transmitted energy and/or redundancy per information bit with additional congestion avoidance mechanisms to overcome possible collisions caused by rapidly changed environment. For instance, some of the congestion avoidance mechanisms can be applied. The UE may control the sensors 530, 540, 550, 560 of the vehicle to obtain information about vehicle parameters.

All of the above congestion indicators combined with the location/velocity information can be used by the application or the network or in pure autonomous mode to control congestion environment on spectrum resources allocated and used for V2X services in given geographical region. As a specific example the amount of active transmitters may be collected and estimated for a certain geographical area. As will be described in more detail below, in case of autonomous transmission mode congestion indicators can be used by the UE to control UE TX parameters. For eNB controlled mode the parameters can be reported to the eNB or the network so that the eNB can then provide control signaling to adjust UE TX parameters.

Congestion Control

The congestion control may be performed by different entities and across different layers depending on the overall system design. For autonomous mode, the L2 and application layer mechanism may be implemented at the UE side operating according to procedures pre-configured by the network or default parameters. For network controlled mode, the congestion indicators may be reported towards network at low (L1/L2) or upper layers and the eNB or servers in the network may issue commands and apply congestion avoidance mechanisms. The UE may implement the control mechanisms in autonomous operation mode and/or may report indicators and/or congestion conditions and execute received commands in network controlled mode.

With reference to FIG. 5 again, computer program instructions for implementing congestion control may form a congestion manager 527 in memory 520. The congestion manager may comprise instructions, corresponding to algorithms and procedures for congestion control, which when executed by the processing circuitry 510 cause the UE to obtain congestion indicators and/or one or more of location, speed and acceleration data according to the congestion control configuration data 522, store the obtained data in memory and compare it to stored indicators 524a if appropriate. The congestion manager may comprise instructions which when executed by the processing circuitry 510 also evaluate the indicators using congestion functions defined by the congestion criteria to determine the congestion condition and compare it to the stored thresholds 525. The congestion manager may also cause the apparatus to transmit indicators to the radio access network and control the UE based on congestion commands received from the network. The congestion manager 527 may include elements that form part of the L1, L2 or upper layers as mentioned above. The memory 520 may also store the received control commands and data 528 needed for executing the control commands.

The congestion manager 527 and processing circuitry 510 may be considered together to form circuitry for obtaining congestion indicators and controlling communication over the sidelink radio interface to control congestion and/or collisions on V2X spectrum resources. The processing circuitry 510 may access and run the instructions stored in the congestion manager to implement the congestion control.

Although the various circuitry components of FIG. 5 have been described with respect to a UE, corresponding components to at least some of the components shown in FIG. 5 may also be provided in the eNB. With reference to FIG. 3 and FIG. 5, the memory 307 of the eNB may store at least congestion indicators 523 and indicators 525 about UEs, such as location information, velocity information and acceleration information, received from nearby UEs. The memory 307 of the eNB may also comprise congestion criteria 524 including threshold data and congestion condition functions. Additionally, the memory may store congestion and collision control commands 528 to be sent to UEs. The program 306 in memory may comprise computer program instructions for congestion control. The computer program instructions, forming a congestion manager, may be executed by the processor 305 to receive indicators and to provide a control mechanism to reduce the congestion and collision of communication on the sidelink using the data stored in memory and also data received from the network, such as data received from the V2X application server.

Congestion Avoidance Mechanisms

The following congestion avoidance mechanisms can be utilized by LTE technology in order to reduce the congestion problem and efficiently use resources allocated for V2X operation by the LTE-based network. In some embodiments, the idea is to control V2X transmission parameters and behavior of V2X terminals in order to ensure reliable performance of the V2X application under dynamic varied congestion conditions in time and space. The provided mechanism aim to adaptively control reliability and latency characteristics for delivery of V2X traffic. The adjustment of the transmission parameters can be done in UE autonomous and/or network controlled mode. The following examples of control function and adjustment of parameters may be adaptively applied based on analysis of congestion condition/criteria:

a. Control of amount of allocated/used resources based on congestion condition in geographical region (semi-static signaling can be used to adjust the amount of sidelink resources allocated for V2V communication). If congestion condition indicates highly congested environment, the network may allocate additional resources or UE may use additional resources for V2X operation. The congestion condition may be associated with any pool of sidelink resources (PSCCH/PSSCH/PSDCH or other channel) and indicated to the V2X users in given geographical region that some of the pre-allocated resources may or should be used if congestion criteria on other resources is satisfied. The resources to be used for various congestion conditions and/or instructions to use additional resources may be included in the received control commands and data 528 in memory.

b. Adjustment of transmit power control settings based on congestion condition or enabling of the randomized TX power transmission mode with adaptive silencing, wherein some of the packet transmissions are dropped. In this case, if congestion criteria is satisfied the V2X user reduces the power so that the communication range is also reduced at the expense of the improved reliability and ability of the neighborhood UEs to receive generated message. Randomized TX power transmission mode with adaptive silencing may involve the UE being operable not to transmit for a random period of time before retransmitting a message or transmitting a new message. Different settings appropriate for different congestion conditions and/or instructions to change the settings may also be stored in the congestion and collision control commands and data 528 in memory.

c. Control of periodically broadcasted packet size including reduction of the packet size by compressing information or reducing content (e.g. excluding not essential information or applying coarser granularity to the broadcasted information) may be used at the application layer. The congestion condition may be reported to upper layers so that application can adjust it behavior accordingly. In case of high congestion, the application may reduce the packet size or packet generation interval. Alternatively, the lower layers (L1 or L2) may reduce the packet transmission rate by dropping some of the application layer packets (i.e. transmit not so frequently). Again, the appropriate packet sizes for various congestion levels and/or specific instructions for reducing levels may be stored in the control commands and data 528 in memory.

d. Control of modulation and coding scheme (MCS) and/or maximum transport block size is subject to congestion condition assuming fixed size resource quota for single MAC protocol data unit (PDU) transmission. V2X user may increase the spectral efficiency of single MAC PDU transmission by using higher order modulation or code rate in order to decrease the amount of spectrum resources used for single MAC PDU transmission. Settings for appropriate spectral efficiency for various congestion conditions, and/or instructions to change the spectral efficiency, may be stored in the control commands and data 528 and may be accessed by the baseband circuitry 404 executing instructions in the congestion manager 527 in some embodiments.

e. Control of sub-channelization parameters including the amount of time (amount of transmission time intervals (TTIs)) and frequency resources (amount of PRBs) used for MAC PDU transmission. V2X user may follow some rule and reduce the size of occupied spectrum resource for single MAC PDU transmission. Again, the relevant data for carrying out the control of sub-channelization parameters may be stored in memory 520 of the UE. The network or UE may also vary the maximum resource size to be used for single MAC PDU transmission.

f. Control of the V2X traffic generation parameters, including packet generation and transmission rate. As above, the relevant parameters for various congestion conditions may be stored in memory 520 of the UE.

g. Control of transmission resources. Additionally to the control of amount of resources, the network may control allocation of transmission resources based on UE location/UE velocity range/UE movement direction or other upper layer information. In particular, the network may allocate orthogonal or quasi-orthogonal resources, either time or frequency or time-frequency, to different groups of V2X users having different geo parameters (location, speed, movement direction). The orthogonal or quasi-orthogonal resource subsets may be different resource pools (both control and data), different sidelink control information (SCI) (control) periods, different time resource pattern T-RPT subsets, different frequency channels, or any combination of the resource division mechanisms. The resource subsets may be allocated, for example, to vehicles moving in different directions and/or with different speeds or on different lanes/streets etc. The grouping of vehicles with similar parameters (such as location, movement, velocity vector etc.) may enable more advanced autonomous resource selection schemes inside the resource subset (transmission scheme utilizing geo-information). The advanced resource allocation schemes may include clustering, medium sensing, spatial packing and other distributed scheduling mechanisms. The grouping may be done based on a single parameter or a number of parameters. For example, allocation of transmission parameters may be done to all UEs having a specific range of coordinates and received power indicators. As another example, the same transmission parameters may be allocated to all UEs in an area associated with a particular geographical area ID. As yet another example, and as indicated above, the transmission parameters may only be allocated to the UEs moving in the same direction in the specific area. It will be appreciated that although examples of grouping based on a single parameter and a combination of two parameters have been mentioned here, grouping based on any parameter or combination of parameters is contemplated. Allocated resources for various locations, velocity range, direction of movement, or other indicators about the UE, or a combination of the indicators may be stored in the control commands and data 528 in memory. The data may be pre-configured by the network, controlled by eNB or application layer and updated when appropriate. Alternatively, the control of transmission resources may be carried out on receipt of the commands.

A process 600 in a vehicle terminal or other UE related to congestion control of sidelink communication will now be described with respect to FIG. 6. The process may for example be controlled by the congestion manager 527 described with respect to FIG. 5. The UE determines indicators 601 related to vehicle terminal and/or surrounding environment. The indicators may comprise a congestion indicator such as the number, or average number, of active V2X users on the sidelink. The terminal may obtain the indicator by controlling its circuitry to receive and monitor messages during pre-configured frequency and time resources. The indicators may also comprise a congestion indicator such as a SL-RSSI, SL-RSRP or SL-RSRQ measurement. The terminal may obtain the indicator by controlling its circuitry to monitor the signal strength or quality during pre-configured frequency and time resources. The indicators may also comprise vehicle or UE parameters such as the location, velocity, acceleration and/or direction of travel of the vehicle or the UE. They terminal may obtain the parameters by controlling sensors 530, 540, 550, 560 located in the vehicle or the UE. At least some of the vehicle parameters may also serve as congestion indicators. For example, a low vehicle speed may indicate a congestion environment. The vehicle terminal then evaluates 602 the indicators and any adjustments to the behavior of the vehicle and transmission parameters that are desired in view of the indicators obtained. This will be described in more detail with respect to FIG. 7.

The vehicle terminal then controls 603 the behavior and adjust parameters in dependence on the evaluation 602. The behavior and parameter control may comprise one or more of the adjustments (a) to (g) described in the section Congestion Avoidance Mechanisms hereinbefore. The control may be in response to pre-configured commands, settings and other data, based on commands received from the network or a combination of both. For example, the UE may operate in network controlled mode for one or more indicators and in autonomous operation mode for one or more other indicators. In some implementations any commands from the network will take precedence over pre-configured instructions if the instructions conflict. In some implementations, the UEs may be switched between network controlled mode and autonomous operation mode depending on for example its location, the time and other indicators. For example, the UE may switch to autonomous operation mode when it moves outside the coverage of the radio access network or a particular PLMN and may switch back to network control mode when it moves into coverage again.

The evaluation of parameters 602 will now be described in more detail with respect to FIG. 7. It will be described with respect to a UE in the form of a terminal in a vehicle but a similar process may apply to other UEs. The vehicle terminal determines 701 the mode of operation. As mentioned above, if the vehicle terminal is configured to use a different mode of operation for different indicators, the vehicle terminal may determine the mode of operation with respect to the specific indicator or combination of indicators obtained. If the vehicle terminal operates in network controlled mode, the vehicle terminal then determines 702 if any evaluation of the indicators in the UE is to be carried out before sending the indicators to the network. For example, the congestion manager 527 may be configured to follow specific procedures for specific indicators or combination of indicators.

If the vehicle terminal is configured to carry out an initial evaluation of indicators, it proceeds to compare 703 the indicators to stored indicator thresholds according to the stored congestion criteria and then determines 704 based on the comparison whether the indicators are to be reported to the eNB or the network. For example, if the UE has obtained a SL-RSSI measurement, the vehicle terminal may be configured to compare the SL-RSSI measurement to a stored SL-RSSI threshold and only send the indicator to the network if the SL-RSSI is higher than the stored indicator threshold 524a, its value has exceeded the stored threshold multiple times or the average value of the SL_RSSI measurement over a period of time is above the threshold. In other examples, it may compare more than one indicator to more than one stored threshold and only send the indicators or the result of the comparison to the network if the indicators match, exceeds or are lower than stored thresholds. For example, the UE may inform the network if it is in an area corresponding to a stored geographical area ID, it is moving with a velocity lower than a stored value and the measured received signal power is above a certain stored threshold value. If the comparison indicates that the vehicle does not need to report the indicators or the result of the comparison to the network, it takes no action 705. It may repeat the process for the same indicators some time later or it may proceed to repeat the process for other indicators.

If the comparison instead indicates that the indicators or the result of the comparison should be reported to the network, it sends 706 the relevant data to the network. It may transmit the data in a control message to its serving eNB. At some time later, after the eNB or the network has evaluated the indicators, it may then receive 707 control commands from the eNB or the network. The control commands will be described in more detail with respect to FIGS. 10 and 11.

If the vehicle terminal instead operates in autonomous operation mode, it may carry out 708, 709 a more detailed evaluation of the indicator or combination of indicators obtained. The congestion criteria may form a congestion function that takes as an argument one or more indicators and outputs a value which may be compared with pre-configured thresholds and/or provide a value that is used to control communication in the sidelink. As mentioned above with respect to FIG. 5, the UE may store a plurality of these functions as part of its pre-configured congestion criteria 524. The UE may apply 708 one or more of these functions to obtained indicators and evaluate 709 the output of the function. For example, the output of a congestion control function may point to instructions to adjust transmission settings stored as part of the control commands and data 528. As a specific example, one of the functions may take as arguments the geo-coordinates of the UE carrying out the evaluation and geo-coordinates of nearby subscriber devices communicated to the UE carrying out the evaluation and the output may indicate frequency resources to be used by the UE to be able to send messages during the same subframe, and even during the same time instance, in order to avoid messages colliding. This congestion function may for example be carried out by the L1 and/or L2 layers. As another example, the output of the function may be compared to stored threshold values and the UE may determine based on the comparison whether to adjust its behavior and/or transmission settings.

If the output of the congestion condition function shows that no action is to be taken the vehicle terminal takes no action 705. It may repeat the process for the same indicator or indicators some time later or it may repeat the process for another indicator or other indicators. If the evaluation shows that adjustments to the behavior or transmission parameters, configured in the control commands and data in memory, are to be carried out, the vehicle terminal carries out the adjustments 710 or cause the adjustments to be carried out. The process may then be repeated for other indicators or, at some time later, it may obtain new values of the indicators to evaluate if any adjustments to the behaviors or transmission parameters are to be carried out.

It will be appreciated that if a UE only ever operates in network controlled mode, the UE will only follow the operations 701 to 707 and if the UE only ever operates in autonomous operation mode the UE will only carry out the operations 708 to 710 and 705. Moreover, it will be appreciated that the process described with respect to FIG. 7 is just one examples and variations are possible. For example, in some processes the UE may not carry out an initial valuation of obtained indicators to determine whether to send the indicators to the network. Moreover, in some processes the initial valuation may not involve comparing the indicators to thresholds. It may involve other operations instead.

A process 800 in an eNB related to congestion control of sidelink communication will now be described with respect to FIG. 8. The eNB receives 801 indicators or data associated with indicators associated with a UE or the congestion environment of the UE. The eNB then evaluates 802 the indicators. The evaluation may comprise applying congestion functions defined in memory to the indicators received from the UEs. In some implementations, the evaluation takes place in the eNB and in some implementations and for some indicators or congestion functions, the evaluation takes place in the network, for example in the V2X server, and the eNB receives data from the network from which it determines congestion commands that it sends the UEs. For example, the eNB may have received the geo-coordinates of UEs within coverage and the eNB may assign to the nearby UEs orthogonal frequency resources in the same subframe or during the same time instance so that message collision problems in the sidelink can be resolved from the receiver perspective. The evaluation of the function may be carried out by the L1 and/or L2 layer. As another example, one of the functions may take as an argument the current max resource allocation size, the received power associated with each transmitter and a number of transmitters detected and as an output it may produce the new settings for max resource allocation size. In some implementations, this function may be carried out in the network and the eNB will forward the new settings to the UEs. It will be appreciated that the two examples of congestion functions given above are only examples and other examples are contemplated depending on which layer is involved in the congestion resolution function.

The eNB then determines 803 appropriate adjustments to the behavior of the UE or its transmission parameters and transmits 804 control commands to the UE to carry out the determined adjustments. As mentioned above, in some implementation, or for some indicators, the V2X server evaluates the indicators and the process 800 in the eNB may not include the evaluation operation 802. Determining 804 appropriate adjustments to the behavior/transmission parameters of the UE may then comprise determining or noting adjustments based on instructions and data received from the V2X server.

In some implementations, the adjustments determined for one UE may depend on indicators received from a plurality of UEs. For examples, if the eNB is notified that a large number of UEs in a particular geographical area are moving at a speed lower than a stored threshold, it may instruct the UEs in that area to adjust their transmission parameters. As another example, if the eNB is notified that an accident has occurred in a specific geographical area it may instruct UEs in the area to adjust their behavior. Consequently, the eNB may send control commands to a UE not only in response to indicators received by the UE but in response to other triggers. Consequently, in some situations process 800 may not involve receiving indicators from the UE.

Figure 6:
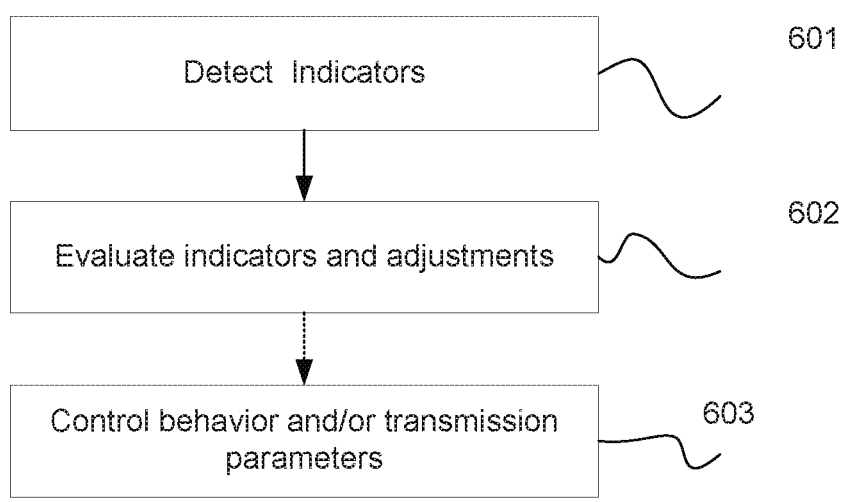
FIG. 6 depicts a flow diagram of processing operations associated with congestion control in a UE.
Figure 7:
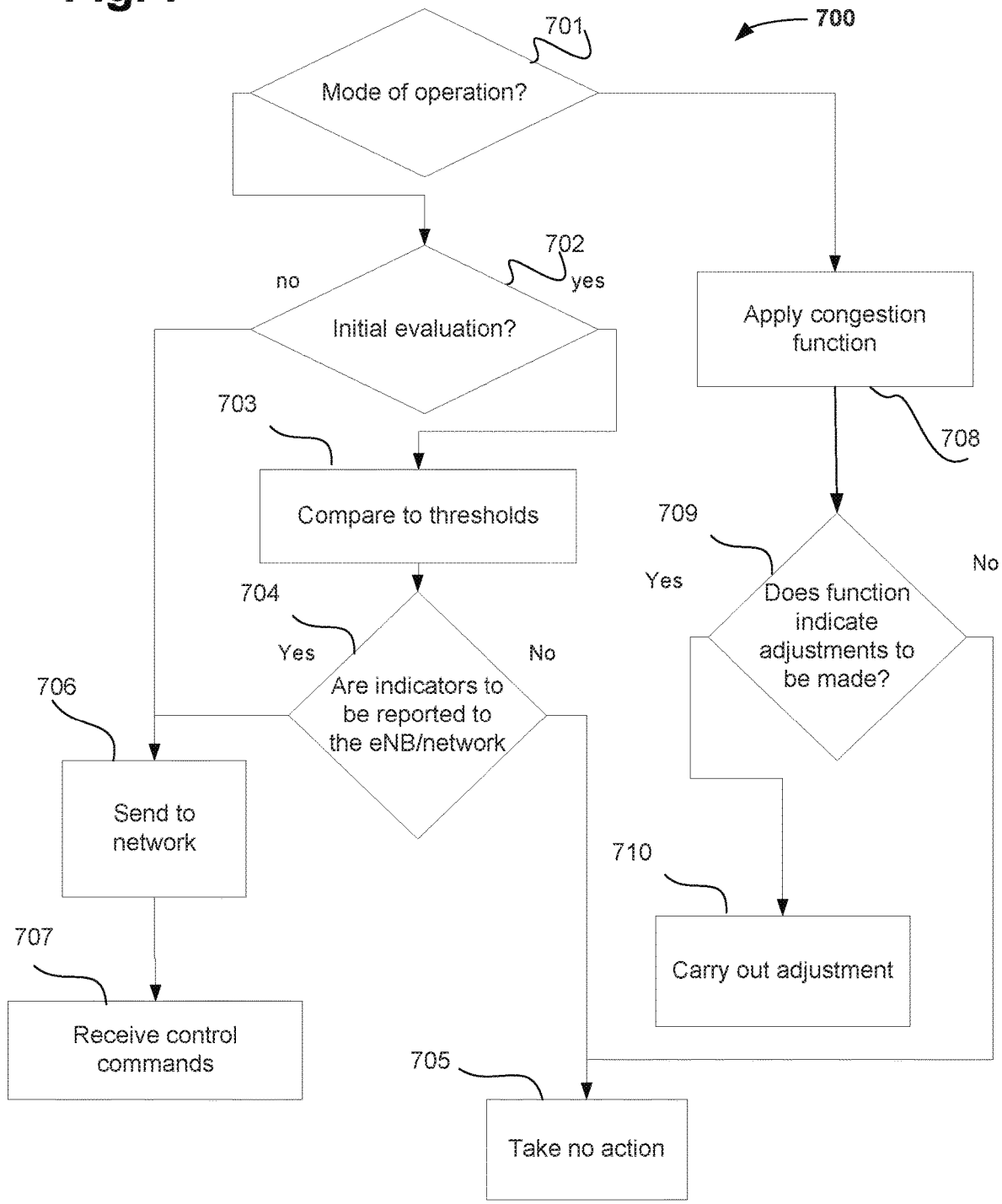
FIG. 7 also depicts a flow diagram of processing operations associated with congestion control in a UE.
Figure 8:
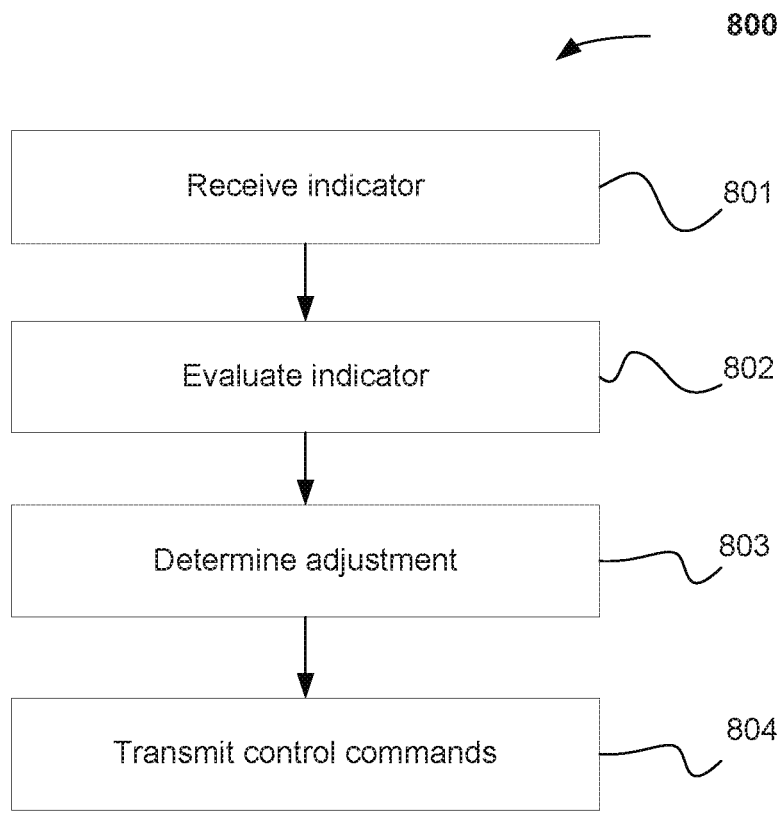
FIG. 8 depicts a flow diagram of processing operations associated with congestion control in a base station.

It will be appreciated that although specific operations have been described with respect to FIGS. 6, 7 and 8, the operations and processes are just examples and other implementations and processes are possible.

Figure 9:
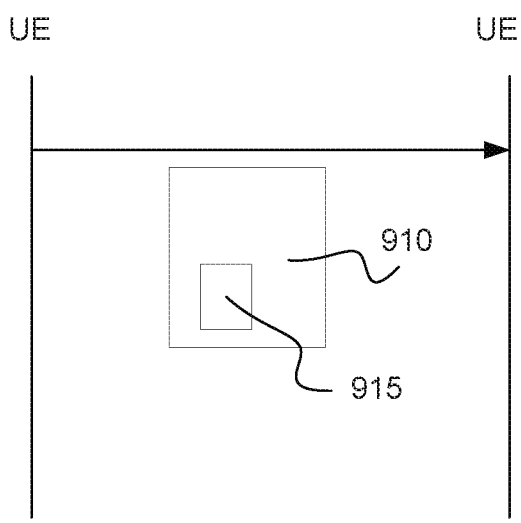
FIG. 9 illustrates an example of signaling between two UEs.

With reference to FIG. 9, the communication between different UEs over a sidelink may involve transmission and reception of sidelink messages 910. The sidelink messages may comprise information about location, velocity and acceleration of the vehicles or UEs. The sidelink messages may comprise an identity 915 of the transmitting entity. The sidelink messages may be provided by L1, L2 or the application layer. For example, geo-coordinates and the velocity of the vehicle may originate from the application layer. However geo-information signaling may also form part of some L1/L2 control signaling.

Figure 10:
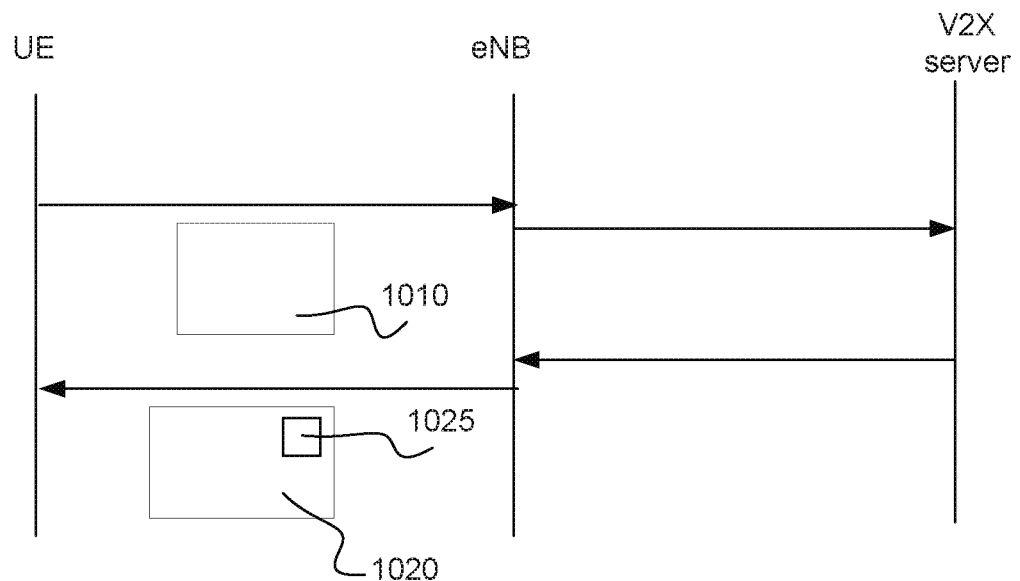
FIG. 10 illustrates an example of signaling between a UE and the network.

With reference to FIG. 10, the control signaling between the UE and the eNB may comprise one or more control messages. The UE may send a control message 1010 with indicators related to the UE and/or surrounding environment to be received by the eNB. The eNB may respond to the UE with a control message 1020 comprising commands for controlling the congestion environment on V2X spectrum used by the UE.

In order to control congestion environment on V2X spectrum resources the eNB may provide control signaling from the V2X server. Consequently, in some implementations and/or for some indicators, the eNB may forward some of the indicators to the V2X server using control signaling between the eNB and the V2X server as shown in FIG. 10. The eNB may also receive data from the V2X server from which it derives or extracts the control commands to the UE. The control signaling provided by the eNB from the V2X server may be defined either at the application layer or lower layers such as L1, L2. For instance, the broadcast, multicast, unicast or geocast signaling may be defined using SIB, RRC, MAC or L1 physical layer signaling in order to control the transmission parameters of V2X users. The signaling from the network may alternatively or additionally be provided as part of upper layer signaling.

The geocast signaling may be associated with the geographical area ID or other indication of geo-information. Indications of geo-information may comprise, but are not limited to, a geo-region identifier, geo-coordinates and their derivatives over time including velocity vector (speed value and direction of travel) and velocity vector derivatives (acceleration value and direction). Using a geographical area ID as an example of geo-information, the signaling is expected to be received only by UEs located in given geographical area mapped to ID and apply corresponding actions based on provided control information. The signaling message between the eNB and the UE may therefore include a geographical area identity 1025.

However, it will be appreciated that when geosignaling is not used, the message 1020 may not include a geographical area ID.

As mentioned hereinbefore, in application to LTE V2V communication the eNB may issue commands to the UE to carry out one or more of the following:
  use or stop using a particular resource pool (e.g. one pool among multiple configured), a set of resource pools, and/or a set of subframes or a set of frequency channels or subchannels for transmission,
  use or stop using particular time/frequency channels or subchannels within particular resource pool(s) (e.g. subset of TRP patterns or PSCCH resource indexes),
  reduce or increase transmission power or restrict maximum transmission power,
  enable probabilistic silencing (e.g. control the UE not to transmit for a configured or random period of time) which may include activating random silencing with pre-configured transmission probability that will result in skipping of certain transmission opportunities,
  reduce or increase maximum transmission rate at L1, by dropping some of the packets at L2 if transmission rate later does not fit the latency criteria or instruction application layer to reduce packet generation frequency,
  reduce or increase traffic generation rate at the upper layers (e.g. issue command to application layer),
  indicate the number of TTIs or the maximum number used for transmission of single MAC PDU (1, 2, 3, 4, . . . , 8, etc),
  indicate maximum resource allocation size in terms of PRBs and TTIs for transmission of single MAC PDU, and/or
  indicate the maximum transport block size (TBS) that can be transmitted over predefined time interval.

The application or execution of all the above commands may depend on geo-information. One or more of the commands may be sent in a geo-information transmission message and the commands may only apply to a UE if the UE is associated with geo-information that matches the geo-information in the message.

In some implementations, the evaluation of at least some indicators may be carried out in the eNB and not in the V2X server and the signaling in FIG. 10 would then be modified not to include any control signaling to the V2X server. The commands sent by the eNB may be associated with certain geo-regions and may not be applicable within the whole network.

Figure 11:
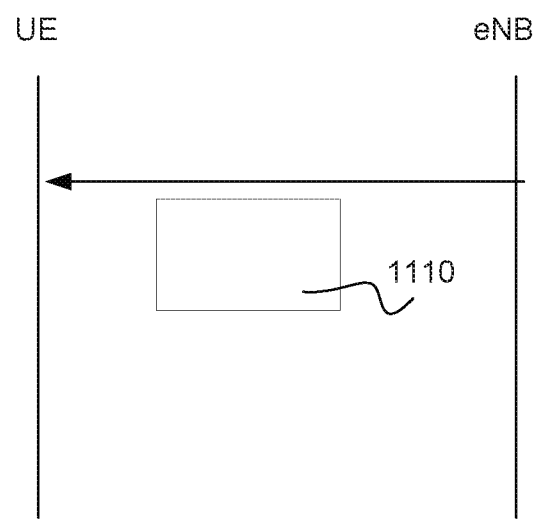
FIG. 11 illustrates another example of signaling between an UE and the network.

With reference to FIG. 11, the eNB may also signal congestion control configuration data and/or congestion criteria to the UE to configure the UE to obtain the relevant indicators and/or evaluate the indicators to carry out the congestion control on V2X spectrum. The signaling may involve the eNB sending a control message 1110 with congestion criteria and configuration data to the UE. The UE stores the criteria and configuration data in memory and some time later when the UE carries out congestion control the congestion manager will access the configuration data and criteria to obtain and evaluate indicators, send indicators to the network if appropriate, and carry out the appropriate adjustment. The configuration data and congestion criteria may be determined based on, or extracted from, data received as part of control signaling from the V2X server. The data provided by the eNB from the V2X server may be defined either at the application layer or lower layers such as L1, L2. For instance, the data may be broadcast, multicast, unicast or geocast using SIB, MAC, RRC or L1 signaling. The eNB may also communicate additional data for carrying out congestion control to the UEs.

Geo-information transmission messages comprising control commands, configuration data and/or congestion criteria may be handled by the UE in different ways depending on the implementations. The UE may receive and process the message, for example in the baseband circuitry or the application circuitry of the UE. The processing may comprise checking if it associated with the geo-information in the message and then adjust its TX/RX behavior according to the instructions in the control message. For example, it may adjust its transmission parameters or start obtaining and reporting specific congestion indicators. If the message does not comprise matching geo-information, the UE may discard the message. In other implementations, the UE may not even receive the geo-information transmission messages if the geo-information does not match the geo-information associated with the UE. The transceiver circuitry may only receive messages and pass them to processing circuitry if the messages indicate relevant geo-information.

Embodiments relate to cross-layer optimization for congestion avoidance of LTE based V2X services. In more detail, some embodiments herein relate to network controlled and UE autonomous methods, processes, or techniques of cross-layer optimization for vehicular-to-vehicular (V2V) or vehicular-to-anything (V2X) communication aiming to reduce the congestion and collision problems in order to control the quality of ITS (intelligent transportation system) applications and improve their reliability.

Figure 12:
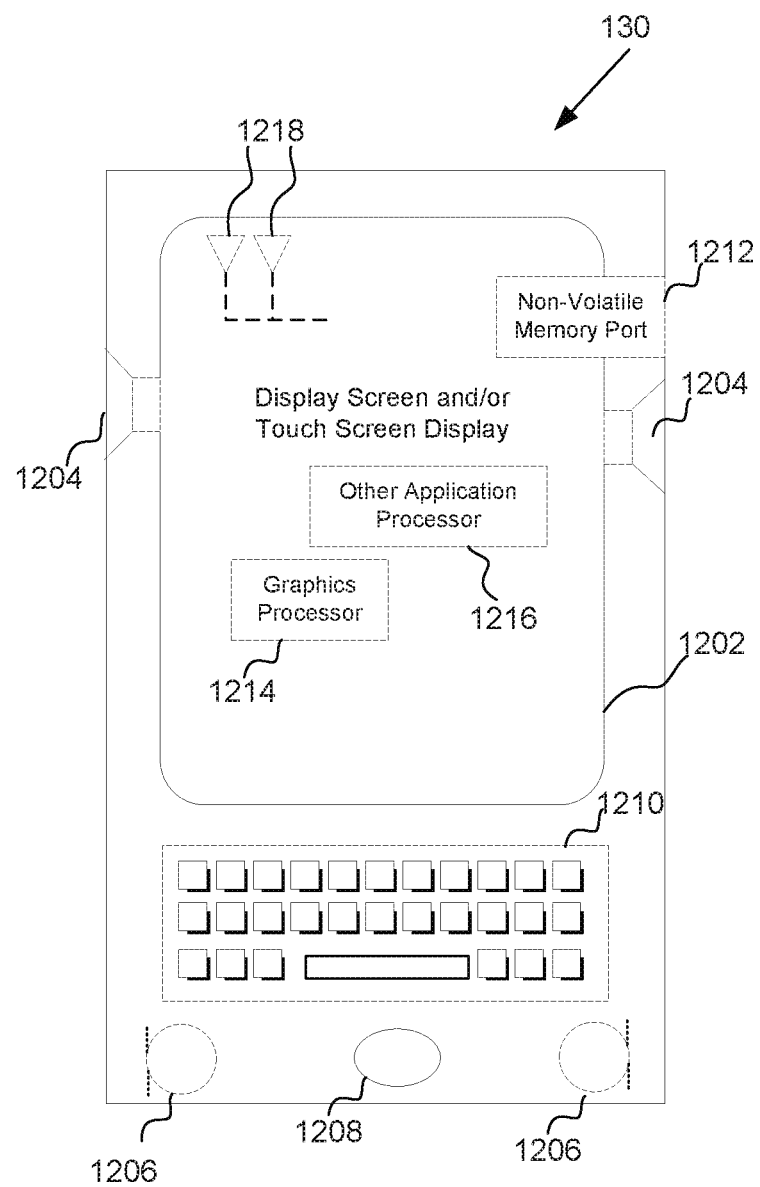
FIG. 12 is a schematic block diagram illustrating some components of an UE in the network.

It will be appreciated that the UE can be implemented in other ways than described with respect to FIGS. 4 and 5 and may comprise alternative or additional components. Additional components of a UE, which can be used in the network described herein, are shown in FIG. 12. For example, the UE may comprise one or more user interfaces, one or more peripheral component interfaces and one or more sensors. In various embodiments, user interfaces could include, but are not limited to, a display 1202 (e.g., a liquid crystal display, a touch screen display, etc.), a speaker 1204, a microphone 1206, one or more cameras 1208 (e.g., a still camera and/or a video camera), a flashlight (e.g., a light emitting diode flash), and a keyboard 1210, taken jointly or severally in any and all permutations. In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit, some of which have already been mentioned hereinbefore with respect to FIG. 5. The positioning unit may interact with a receiver chain of the UE to receive signals from components of a positioning network, e.g., a global navigation satellite system (GNSS). In various embodiments, the UE may be a computing device such as a mobile computing device, a roadside unit or a vehicle terminal. A mobile computer device may comprise but is not limited to, a laptop computing device, a tablet computing device, a netbook, a mobile phone, etc. In various embodiments, the UE may have more or fewer components, and/or different architectures. Additionally, the mobile device 130 may comprise at least one or more of a memory port 1212 for receiving additional memory (not shown), a graphics processor 1214 and an application processor 1216, taken jointly and severally in any and all permutations. The mobile device can comprise one, or more than one, antenna 1218. The UE is illustrated as a mobile phone in FIG. 12 but the components described may also be implemented, although they may have a different position with respect to each other, in a vehicle terminal or a roadside unit. When the UE is a vehicle terminal for example the graphics processor may be used to show graphical representations of the surrounding environment on the display 1202 to the driver, and/or other user, of the vehicle.

Although specific embodiments and implementations have been illustrated and described herein, it will be appreciated by those of ordinary skill in the art that a wide variety of alternate and/or equivalent embodiments or implementations designed to achieve the same purposes may be substituted for the specific embodiments and implementations shown and described, without departing from the scope of the present disclosure. This application is intended to cover any adaptations or variations of the embodiments discussed herein. Therefore, it is manifestly intended that the embodiments of the present disclosure be limited only by the claims and the equivalents thereof.

It will be appreciated that although implementations of the eNB, the UE, and a signaling messages with congestion indicators and control commands have been described with respect to specific examples shown in the drawings other implementations are contemplated. It will be appreciated that although a base station in the network has been described as an eNodeB or eNB, the description is relevant to any base station that can implement the processes and methods described. In embodiments, the implemented wireless network may be a 3rd Generation Partnership Project's long term evolution (LTE) advanced wireless communication standard, which may include, but is not limited to releases 14, or later, of the 3GPP's LTE-A or LTE-Advanced Pro standards and beyond. While embodiments are described with reference to an LTE network, some embodiments may be used with other types of wireless access networks, for example another wireless access network implementing a 3GPP wireless communication standard. The wireless access network may implement a next generation 3GPP wireless communication standard. In some implementations, the wireless network may be a $3^{rd}$ Generation Partnership Project's Fifth Generation (5G) wireless network and implement a 3GPP 5G wireless communication standard.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Although the examples and embodiments have been described separately with respect to their accompanying drawings, embodiments are not limited thereto. Embodiments can be realized in which the embodiments or examples associated with the figures can be taken jointly and severally in any and all permutations. For example, the features of FIG. 1, and/or the features of the description of FIG. 1, can be taken together with the features of FIG. 2 or the description of FIG. 2 and so on.

Where variations of examples or embodiments have been presented as being at least a member of an enumerated list, either with or without the accompanying language "taken jointly or severally in any and all permutations", it is clear that all permutations of such enumerated list members are contemplated, which is made more emphatic by the accompanying language "taken jointly and severally in any and all permutations" or, where appropriate, "taken jointly and severally in any and all combinations".

Embodiments can be realized according to any of the following clauses and/or examples taken jointly and severally in any and all permutations:

Clause 1. Apparatus for use in a wireless communication system supporting vehicle-to-anything (V2X) communication, the apparatus comprising:
  transceiver circuitry to communicate via uplink and downlink radio interface with a radio access network of a wireless communication network and communicate directly via sidelink radio interface with one or more out of a vehicle terminal and/or a roadside unit; and
  control circuitry coupled to the transceiver circuitry to determine one or more indicator related to the apparatus and/or surrounding environment and control the transceiver circuitry to control communication over the sidelink radio interface based on the determined one or more indicator to control congestion on V2X spectrum resources.

Clause 2. Apparatus according to clause 1, wherein the transceiver circuitry is configured to communicate via the sidelink radio interface with one or more vehicle terminal and configured to communicate via the uplink and downlink interface with one or more roadside unit forming part of the radio access network.

Clause 3. Apparatus according to clause 1 or 2, wherein the transceiver circuitry is configured to receive signaling messages from the network comprising information to provide synchronization and common timing reference for sidelink operation between vehicles.

Clause 4. Apparatus according to clause 3, wherein the synchronization and common timing reference for sidelink radio interface comprises at least one out of:
  common timing reference across wide geographical area using network timing reference or global navigation satellite system (GNSS) synchronization;
  enhancement to resource allocation by dividing spectrum resources on slotted time intervals for transmission of predefined duration;
  allocation of common and aligned functional time intervals for transmission of different channel or information types; and/or
  synchronized multi-channel operation across multiple bands using common cellular reference carrier or GNSS.

Clause 5. Apparatus according to any one of the preceding clauses, wherein the transceiver circuitry is configured to receive signaling messages comprising control commands from the radio access network and the control circuitry is configured to control the transceiver circuitry based on the control commands.

Clause 6. Apparatus according to clause 5, wherein the control commands comprise congestion and/or collision control commands.

Clause 7. Apparatus according to clause 5 or 6, wherein the signaling messages comprising the control commands are provided using one out of physical layer signaling, radio resource control (RRC) signaling, system information block (SIB) signaling and/or media access control (MAC) signaling and/or application layer signaling.

Clause 8. Apparatus according to clause 5, 6 or 7, wherein a signaling message of the signaling messages comprises an indicator of geo-information and the apparatus is configured to operate according to a control command in the signaling message if the indication of geo-information in the message corresponds to geo-information associated with the apparatus.

Clause 9. Apparatus according to clause 8, wherein the indication of geo-information comprises one or more out of geo-coordinates, a geo-region identifier and/or a velocity vector.

Clause 10. Apparatus according to clause 8 or 9, wherein the indication of geo-information comprises a geographical area indicator or identifier corresponding to a geographical area and the apparatus is operable to operate according to the control command in the signaling message if the geographical area indicator or identifier corresponds to a geographical area in which the apparatus is located.

Clause 11. Apparatus according to any one of clauses 5 to 10, wherein the control commands comprise commands to control sidelink behavior and/or adjust transmission settings.

Clause 12. Apparatus according to any one of clauses 5 to 11, wherein the control commands comprise commands to carry out one or more of the following:
  use or stop using a particular resource pool, a set of resource pools, and/or a set of subframes or a set of frequency channels or frequency sub-channels for transmission;
  use or stop using at least one out of a particular time period or frequency subchannel within a particular resource pool;
  reduce or increase transmission power or restrict maximum transmission power;
  activate random silencing with pre-configured transmission probability that will result in skipping of certain transmission opportunities;
  reduce or increase maximum transmission rate measured at physical or upper layers;
  reduce or increase traffic generation rate at the upper layers;
  adjust the number of transmission time intervals (TTIs) or the maximum number used for transmission of single medium access control (MAC) protocol data unit (PDU);
  adjust maximum resource allocation size in terms of physical resource blocks (PRBs) and transmission time intervals (TTIs) for transmission of single MAC PDU; and/or
  adjust the maximum transport block size (TBS) size that can be transmitted over a predefined time interval.

Clause 13. Apparatus according to clause 12, wherein the control commands comprise a control command to reduce maximum transmission rate measured at physical or upper layers and the apparatus is operable, in accordance with the control command, to drop some of the packets at physical or upper layers or instruct an application layer to reduce packet generation frequency.

Clause 14. Apparatus according to any one of the preceding clauses, wherein the transceiver circuitry is configured to transmit signaling messages to the radio access network and the control circuitry is configured to control the transceiver to include one or more of the one or more indicators in a signaling message of the signaling messages to the radio access network.

Clause 15. Apparatus according to any one of the preceding clauses, wherein the apparatus comprises a memory for storing congestion criteria and the control circuitry is configured to evaluate one or more of the one or more indicators based on the congestion criteria in memory.

Clause 16. Apparatus according to clause 15, wherein the control circuitry is configured to cause the transceiver circuitry to control communication over the sidelink radio interface based on the evaluation of one or more of the determined one or more indicators and stored data.

Clause 17. Apparatus according to clause 16, wherein the stored data comprises commands to, for a particular congestion condition determined in the evaluation, carry out one or more of the following operations:
- use or stop using a particular resource pool, a set of resource pools, and/or a set of subframes or a set of frequency channels or frequency sub-channels for transmission;
- use or stop using at least one out of a particular time period or frequency subchannel within a particular resource pool;
- reduce or increase transmission power or restrict maximum transmission power;
- activate random silencing with pre-configured transmission probability that will result in skipping of certain transmission opportunities;
- reduce or increase maximum transmission rate measured at physical or upper layers;
- reduce or increase traffic generation rate at the upper layers;
- adjust the number of transmission time intervals (TTIs) or the maximum number used for transmission of single medium access control (MAC) protocol data unit (PDU);
- adjust maximum resource allocation size in terms of physical resource blocks (PRBs) and transmission time intervals (TTIs) for transmission of single MAC PDU; and/or
- adjust the maximum transport block size (TBS) size that can transmitted over a predefined time interval.

Clause 18. Apparatus according to clause 15, 16 or 17, wherein the congestion criteria is configured by the network over the uplink and downlink radio interface.

Clause 19. Apparatus according to any one of the preceding clauses, wherein the one or more indicator comprises at least one out of sidelink received signal strength indication (SL-RSSI), sidelink reference signal received quality (SL-RSRQ) or sidelink reference signal received power (SL-RSRP) obtained at one or more preconfigured time or frequency spectrum resources and over predefined time intervals.

Clause 20. Apparatus according to any one of the preceding clauses, wherein the one or more indicators comprise at least one spectrum resource utilization metrics, comprising one or more out of a percentage of utilized sidelink control resources and/or a percentage of utilized sidelink shared resources where the percentage of utilization may be associated with a received power level and/or collected according to geo-information and at pre-configured time intervals.

Clause 21. Apparatus according to any one of the preceding clauses, wherein the one or more indicator comprises a number of active transmitters detected in a geographical area over a predetermined time period.

Clause 22. Apparatus according to any one of the preceding clauses, wherein the one or more indicator comprises one or more out of location, velocity vector and/or its derivatives such as acceleration vector and/or direction of travel of the apparatus.

Clause 23. Apparatus according to any one of the preceding clauses, wherein the sidelink radio interface is a Long Term Evolution (LTE) PC5 sidelink radio interface and the uplink and downlink radio interface is a LTE Uu radio interface.

Clause 24. Apparatus according to clause 23, wherein the transceiver circuitry is configured to communicate using spectrum allocated for V2X operation by a mobile network operator.

Clause 25. Apparatus according to any one of the preceding clauses, wherein the transceiver circuitry is configured to communicate using dedicated V2X spectrum.

Clause 26. Apparatus according to any one of the preceding clauses, wherein the transceiver circuitry is configured to use LTE transport protocols to communicate with the radio access network and the control circuitry is configured, based on signaling from the network, to control the transceiver circuitry to control vehicle-to-vehicle (V2V) communication over the sidelink radio interface to reduce collision problems and optimize V2X system performance.

Clause 27. Apparatus according to any one of the preceding clauses, wherein the control circuitry comprises baseband circuitry.

Clause 28. Apparatus according to any one of the preceding clauses, further comprising one or more of: a screen, a speaker, a keyboard, multiple antennas and/or a speaker.

Clause 29. A user equipment comprising an apparatus of any one of the preceding clauses.

Clause 30. A vehicle terminal comprising an apparatus of any one of clauses 1 to 28.

Clause 31. A vehicle comprising a vehicle terminal according to clause 30.

Clause 32. A roadside unit comprising an apparatus of any one of clauses 1 to 28.

Clause 33. A user equipment, vehicle terminal or roadside unit according to clause 29, 30 or 32, for use in a network implementing a long term evolution (LTE) advanced or LTE advanced pro wireless communication standard.

Clause 34. Apparatus for use in a radio access network of a wireless communication network supporting vehicle-to-anything (V2X) services, the apparatus comprising:
- transceiver circuitry to transmit a wireless signal to a V2X terminal in a radio cell, the V2X terminal being configured to communicate directly via sidelink radio interface with another V2X terminal; and
- processing circuitry coupled to the transceiver circuitry to:
  - determine a control command for controlling communication over the sidelink radio interface by the V2X terminal based on one or more indicators associated with the terminal and/or surrounding environment of the terminal; and
  - cause the transceiver circuitry to transmit the control command to the V2X terminal.

Clause 35. Apparatus according to clause 34, wherein the transceiver circuitry is further configured to receive said one or more indicators from the terminal.

Clause 36. Apparatus according to clause 34 or 35, wherein the transceiver circuitry is configured to receive sidelink measurements collected by a plurality of V2X terminals via a uplink and downlink interface and evaluate the measurements, the sidelink measurements comprising one or more of said one or more indicators.

Clause 37. Apparatus according to clause 34, 35 or 36, wherein the one or more indicators comprises, or is based on, at least one out of sidelink received signal strength indication (SL-RSSI), sidelink reference signal received quality (SL-RSRQ) or sidelink reference signal received power (SL-RSRP) obtained at one or more preconfigured time or frequency spectrum resources and over predefined time intervals.

Clause 38. Apparatus according to any one of clauses 34 to 37, wherein the one or more indicators comprises a number of active transmitters detected in a geographical area over a predetermined time period.

Clause 39. Apparatus according to any one of clauses 34 to 38, wherein the one or more indicators comprises one or more out of a location, velocity vector, acceleration vector and/or direction of travel of the V2X terminal.

Clause 40. Apparatus according to any one of clauses 34 to 39, wherein the control command comprises a command to the V2X terminal to adjust transmission settings to control congestion and/or collision of communications on V2X spectrum resources.

Clause 41. Apparatus according to any one of clauses 34 to 40, wherein the control command comprise a control command to carry out one or more of the following:
- use or stop using a particular resource pool, a set of resource pools, and/or a set of subframes or a set of frequency channels or frequency sub-channels for transmission;
- use or stop using at least one out of a particular time period or frequency subchannel within a particular resource pool;
- reduce or increase transmission power or restrict maximum transmission power;
- activate random silencing with pre-configured transmission probability that will result in skipping of certain transmission opportunities;
- reduce or increase maximum transmission rate measured at physical or upper layers;
- reduce or increase traffic generation rate at the upper layers;
- adjust the number of transmission time intervals (TTIs) or the maximum number used for transmission of single medium access control (MAC) protocol data unit (PDU);
- adjust maximum resource allocation size in terms of physical resource blocks (PRBs) and transmission time intervals (TTIs) for transmission of single MAC PDU; and/or
- adjust the maximum transport block size (TBS) size that can transmitted over predefined time interval.

Clause 42. Apparatus according to any one of clause 34 to 41, wherein the transceiver circuitry is operable to transmit the control command in one out of a unicast, multicast, broadcast or geo-information transmission message.

Clause 43. Apparatus according to any one of clauses 34 to 41, wherein the processing circuitry is configured to determine the control command for the V2X terminal based on geo-information associated with the V2X terminal and to control the transceiver circuitry to transmit the control command in a geo-information transmission message comprising an indication of the geo-information associated with the V2X terminal.

Clause 44. Apparatus according to any one of clauses 34 to 43, wherein the processing circuitry is configured to transmit the control command using one out of physical layer signaling, radio resource control (RRC) signaling, system information block (SIB) signaling and/or media access control (MAC) signaling, and/or application layer signaling.

Clause 45. An eNB comprising apparatus according to any one of clauses 34 to 44.

Clause 46. An eNB according to clause 45 for use in a network implementing a Long Term Evolution (LTE) advanced or LTE advanced pro wireless communication standard.

Clause 47. A method for controlling a terminal for use in a wireless communication system supporting vehicle-to-anything (V2X) communication, the method comprises:
- communicating via uplink and downlink radio interface with a base station of the wireless communication system,
- communicating via sidelink radio interface of the wireless communication system with one or more V2X terminals; and
- controlling communication over the sidelink radio interface based on one or more indicators related to the terminal and/or surrounding environment to control congestion and/or collision of messages on the sidelink.

Clause 48. A method according to clause 47, further comprising receiving a message comprising a control command from the base station, wherein controlling communication over the sidelink comprises controlling communication in accordance with the control command.

Clause 49. A method according to clause 48, wherein the control command comprises a command for adjusting sidelink spectrum resource allocation.

Clause 50. A method according to clause 48 or 49, wherein the message comprises an indicator of geo-information and the method further comprises controlling communication according to the control command in the message if the indication of geo-information in the message corresponds to geo-information associated with the terminal.

Clause 51. A method according to any one of clauses 47 to 50, wherein the method comprises obtaining the one or more indicators and causing one or more of the one or more indicators to be transmitted to the base station.

Clause 52. A method of controlling communication in a wireless communication network supporting vehicle-to-anything (V2X) services, the method comprising:
- communicating via an uplink and downlink radio interface with a V2X terminal of the wireless communication network,
- determining an adjustment to spectrum resource allocation for a V2X sidelink radio interface for controlling congestion and/or collision of V2X communication over the sidelink radio interface; and
- causing a control command to be transmitted to the V2X terminal based on the determined adjustment.

Clause 53. A method according to clause 52, wherein the adjustment is determined based on one or more indicators received from the V2X terminal, the one or more indicators comprising one or more out of a congestion indicator, a location of the V2X terminal, a velocity of the V2X terminal, an acceleration of the V2X terminal and/or a direction of travel of the V2X terminal.

Clause 54. A method according to clause 52 or 53, wherein determining an adjustment comprises determining an adjustment based on geo-information associated with the V2X terminal and wherein causing a control command to be transmitted comprises causing a control command to be transmitted in a message comprises an indication of the geo-information associated with the V2X terminal.

Clause 55. Apparatus comprising means for implementing a method of any one of clauses 47 to 54.

Clause 56. Machine executable instructions arranged, when executed by at least one processor, for implementing a method of any one of clauses 47 to 54.

Clause 57. Machine readable storage storing machine executable instructions according to clause 56.

Clause 58. A non-transient computer readable medium comprising machine executable instructions according to clause 56.

Clause 59. Apparatus for use in a communications system adapted to support vehicle-to-anywhere (V2X) services by Long Term Evolution LTE technology and comprising:
- at least two radio interfaces comprising:
  - a Long Term Evolution (LTE) wireless communication standard sidelink air-interface for communication with vehicles and/or roadside units; and
  - a LTE Uu downlink and uplink radio air-interface for communication with network and/or roadside units, and
- circuitry to provide network assisted control of vehicle-to-vehicle V2V communication over the sidelink radio interface to reduce collision problems and optimize V2X system performance.

Clause 60. Apparatus according to clause 59, wherein the circuitry is configured to cause one or more indicators comprising one or more congestion indicators and/or one or more indicators associated with surrounding environment of the apparatus to be obtained and to be transmitted to the network via the LTE Uu downlink and uplink radio air-interface.

Clause 61. A vehicle terminal for use in a wireless network comprising:
- transceiver circuitry to communicate via uplink and downlink radio interface with a radio access network of a wireless communication network and communicate via sidelink radio interface of the wireless communication network with one or more other vehicle terminals; and
- control circuitry coupled to the transceiver circuitry to adjust transmission settings for communication over the sidelink radio interface, based on network assisted signaling, to control congestion on vehicle-to-anything spectrum resources.

Clause 62. A vehicle terminal according to clause 61, wherein the control circuitry is configured to adjust the transmission settings in accordance with spectrum resource allocation commands received from the radio access network.

Clause 63. A vehicle terminal according to clause 61 or 62, wherein the control circuitry is configured to cause the transceiver circuitry to transmit congestion indicators to the radio access network.

Clause 64. An apparatus, user equipment (UE), vehicle terminal, method, eNodeB substantially as described herein with reference to and/or as illustrated in any one or more of the accompanying drawings.

Example 1 may include a single technology dual air-interface architecture based on long term evolution (LTE) PC5/sidelink and LTE Uu/downlink & uplink radio/transport protocols and method and/or apparatus to support vehicle-to-anything (V2X) services by LTE technology comprising
  a. At least two radio interface technologies comprising
    i. LTE PC5 air-interface is used for communication with vehicles and/or roadside units
    ii. LTE Uu air-interface is used for communication with network and/or roadside units
  b. Network assisted control of vehicle-to-vehicle (V2V) communication over sidelink radio interface (e.g., LTE PC5) to reduce collision problems and optimize V2X system performance.

Example 2 may include the architecture, method, and/or apparatus of example 1 or some other example herein, wherein sidelink radio interface is used for communication between vehicles or between vehicles and road side units, that operates on dedicated V2X spectrum (e.g. an intelligent transportation system (ITS) band) or any other spectrum resource allocated for V2X operation by LTE operators.

Example 3 may include the architecture, method, and/or apparatus of example 1 or some other example herein, wherein LTE radio interface is used for vehicle communication with the network or road side units providing V2X services or V2X server and provides seamless coverage and ubiquitous connectivity for ITS applications worldwide on licensed spectrum or any dedicated ITS spectrum.

Example 4 may include the architecture, method, and/or apparatus of example 1 or some other example herein, wherein the network assistance information is used
  a. to provide synchronization and common timing reference for sidelink operation between vehicles.
  b. to provide control mechanism to reduce the congestion and collision for vehicular communication in terms of spectrum resource allocation.

Example 5 may include the architecture, method, and/or apparatus of example 4 or some other example herein, wherein the synchronization and common timing reference for sidelink radio interface comprises
  i. Common timing reference across wide geographical area using network timing reference or global navigation satellite system (GNSS) synchronization aligned with the network timing
  ii. Enhancement to resource allocation by dividing spectrum resources on slotted time intervals for transmission of predefined duration
  iii. Allocation of common and aligned functional time intervals for transmission of different channel or information types (control commands, data, etc.)
  iv. Synchronized multi-channel operation across multiple bands (operation over multiple channels in 5.9 gigahertz (GHz) band) using common cellular reference carrier.

Example 6 may include the architecture, method, and/or apparatus of example 4 or some other example herein, wherein control mechanism to reduce the congestion and collision comprises
  a. Congestion criteria.
  b. Sidelink measurements (e.g. sidelink reference signal received power (SL-RSRP), sidelink reference signal received quality (SL-RSRQ), sidelink receive strength signal indicator (SL-RSSI)) and their reporting based on configured congestion indicators for configured measurement resource sets
  c. Congestion function used to determine the level of congestion
  d. Congestion control commands signaled to V2X users.

Example 7 may include the architecture, method, and/or apparatus of example 6 or some other example herein, where in congestion criteria is configured by network and provided to V2X terminals through LTE air-interface comprises at least the following congestion indicators for operation using sidelink air-interface
  a. Measurements of SL-RSSI, SL-RSRQ and SL-RSRP conducted at the configured time/frequency spectrum resources and over predefined time intervals
  b. Medium monitoring an average number of active transmitters detected in given geographical region distinguished by L1/L2 or other identities.

Example 8 may include the architecture, method, and/or apparatus of example 6 or some other example herein, wherein sidelink measurement are collected by V2X terminals and reported back to network through LTE Uu air-interface to evaluate congestion function and generate congestion control commands either at the L1, L2 or upper layers e.g. application layer.

Example 9 may include the architecture, method, and/or apparatus of example 6 or some other example herein, wherein the congestion control commands are provided to V2X users through LTE Uu air-interface so that sidelink behavior and transmission settings are adjusted and comprise the following assistance signaling commands to i. use or stop using particular resource pool for transmission (e.g. one pool among multiple configured), ii. use or stop using particular time/frequency channels or subchannels within particular resource pool(s) (e.g. subset of total radiated power (TRP) patterns or physical sidelink control channel (PSCCH) resource indexes)

iii. reduce or increase transmission power or restrict maximum transmission power iv. apply probabilistic silencing for transmission or retransmissions v. reduce or increase maximum transmission rate at L1 vi. reduce or increase traffic generation rate at the upper layers (e.g. issue command to application layers)

vii. indicate the number of TTIs or the maximum number used for transmission of single medium access control (MAC) protocol data unit (PDU_(1, 2, 3, 4, . . . , 8, etc)

viii. indicate maximum resource allocation size in terms of physical resource blocks (PRBs) and transmission time intervals (TTIs) for transmission of single MAC PDU ix. indicate the maximum transport block size (TBS) size that can transmitted over predefined time interval.

Example 10 may include the architecture, method, and/or apparatus of example 9 or some other example herein, wherein the network assistance signaling is based on unicast, multicast, broadcast, or geocast transmissions and provided either through L1, L2 (MAC commands or radio resource control (RRC) signaling, system information block (SIB) or upper layer signaling.

Example 11 may include the architecture, method, and/or apparatus of example 10 or some other example herein, wherein geocast transmissions are associated with the geographical area ID and should be handled only by terminals located in geographical area associated with given ID.

Example 12 may include the architecture, method, and/or apparatus of example 10 or some other example herein, wherein geocast transmissions or transmission resources are associated with velocity vector, velocity range, location and should be handled by terminals with the corresponding velocity parameters either autonomously or under network control, in case when geo-information associated with vehicles is reported to eNodeB.

Example 13 may include an apparatus comprising means to perform one or more elements of a method described in or related to any of examples 1-12, or any other method or process described herein.

Example 14 may include one or more non-transitory computer-readable media comprising instructions to cause an electronic device, upon execution of the instructions by one or more processors of the electronic device, to perform one or more elements of a method described in or related to any of examples 1-12, or any other method or process described herein.

Example 15 may include an apparatus comprising logic, modules, and/or circuitry to perform one or more elements of a method described in or related to any of examples 1-12, or any other method or process described herein.

Example 16 may include a method, technique, or process as described in or related to any of examples 1-12, or portions or parts thereof.

Example 17 may include a method of communicating in a wireless network as shown and described herein.

Example 18 may include a system for providing wireless communication as shown and described herein.

Example 19 may include a device for providing wireless communication as shown and described herein.

The invention claimed is:

1. In a wireless communication system supporting vehicle-to-anything (V2X) communication, a user equipment (UE) comprising:
a transceiver configured to: (i) communicate via an uplink and a downlink radio interface with a radio access network of the wireless communication system, and (ii) communicate directly via a sidelink radio interface with a vehicle terminal or a roadside unit; and
a controller comprising at least one processing unit, data storage, and program instructions stored in the data storage and executable by the at least one processing unit to carry out operations, the operations comprising:
determining one or more indicators related to the UE or a surrounding environment of the UE, wherein the one or more indicators comprise at least one of a velocity vector, an acceleration vector, or a direction of travel of the UE;
determining, based on the at least one of the velocity vector, acceleration vector, or direction of travel of the UE, a congestion condition of the sidelink radio interface; and
in response to determining that the congestion condition is greater than a threshold congestion, controlling communication over the sidelink radio interface to decrease congestion on the sidelink radio interface to be less than the threshold congestion.

2. The UE of claim 1, wherein the transceiver is further configured to receive signaling messages comprising control commands from the radio access network and the operations further comprising:
controlling the transceiver based on the control commands.

3. The UE of claim 2, wherein a signaling message of the signaling messages comprises an indicator of geo-information and the UE is configured to operate according to a control command in the signaling message if the indication of geo-information in the message corresponds to geo-information associated with the UE.

4. The UE of claim 3, wherein the indication of geo-information comprises geo-coordinates, a geo-region identifier, or a velocity vector.

5. The UE of claim 2, wherein the control commands comprise commands to control sidelink behavior or adjust transmission settings.

6. The UE of claim 2, wherein the control commands comprise commands to:
use or stop using a particular resource pool, a set of resource pools, and/or a set of subframes or a set of frequency channels or frequency sub-channels for transmission;
use or stop using at least one out of a particular time period or frequency subchannel within a particular resource pool;
reduce or increase transmission power or restrict maximum transmission power;
activate random silencing with pre-configured transmission probability that will result in skipping of certain transmission opportunities;
reduce or increase traffic generation rate at the upper layers;

adjust a number of transmission time intervals (TTIs) or the maximum number used for transmission of single medium access control (MAC) protocol data unit (PDU);

adjust maximum resource allocation size in terms of physical resource blocks (PRBs) and transmission time intervals (TTIs) for transmission of single MAC PDU; or adjust the maximum transport block size (TBS) size that can be transmitted over a predefined time interval.

7. The UE of claim 2, wherein the control commands comprise commands to adjust a number of transmission time intervals (TTIs) or the maximum number used for transmission of single medium access control (MAC) protocol data unit (PDU).

8. The UE of claim 1, wherein the transceiver is configured to transmit signaling messages to the radio access network and the operations further comprising:
    controlling the transceiver to include at least one of the one or more indicators in a signaling message of the signaling messages to the radio access network.

9. The UE of claim 1, wherein the apparatus comprises a memory for storing congestion criteria and the operations further comprising:
    evaluating at least one of the one or more indicators based on the congestion criteria in memory.

10. The UE of claim 9, wherein the operations further comprise:
    causing the transceiver to control communication over the sidelink radio interface based on the evaluation of the at least one of the determined one or more indicators and stored data.

11. The UE of claim 10, wherein the congestion criteria is configured by the radio access network over the uplink and downlink radio interface.

12. The UE of claim 1, wherein the one or more indicators further comprise:
    a sidelink received signal strength indication (SL-RSSI), a sidelink reference signal received quality (SL-RSRQ), or a sidelink reference signal received power (SL-RSRP) obtained at one or more preconfigured time or frequency spectrum resources and over predefined time intervals.

13. The UE of claim 1, wherein the sidelink radio interface is a Long Term Evolution (LTE) PCS sidelink radio interface and the uplink and downlink radio interface is a LTE Uu radio interface, wherein the transceiver is configured to use LTE transport protocols to communicate with the radio access network and the operations further comprise:
    based on signaling from the network, controlling the transceiver to control vehicle-to-vehicle (V2V) communication over the sidelink radio interface to reduce collision problems and optimize V2X system performance.

14. The UE of claim 1, wherein the transceiver is configured to receive from the radio access network signaling messages comprising information to provide synchronization and common timing reference for communication over the sidelink interface, wherein the synchronization and common timing reference for sidelink radio interface comprises at least one of:
    common timing reference across a geographical area using network timing reference or global navigation satellite system (GNSS) synchronization;
    enhancement to resource allocation by dividing spectrum resources on slotted time intervals for transmission of predefined duration;
    allocation of common and aligned functional time intervals for transmission of different channel or information types; or
    synchronized multi-channel operation across multiple bands using common cellular reference carrier or GNSS.

15. In a wireless communication system supporting vehicle-to-anything (V2X) communication, a radio access network (RAN) comprising:
    a transceiver configured to transmit a wireless signal to a V2X terminal served by the RAN, the V2X terminal configured to communicate directly via a sidelink radio interface with another V2X terminal; and
    one or more processors configured to:
        receive, from the V2X terminal, one or more indicators associated with the V2X terminal or a surrounding environment of the V2X terminal, wherein the one or more indicators comprise at least one of a velocity vector, an acceleration vector, or a direction of travel of the V2X terminal;
        determine, based on the at least one of the velocity vector, acceleration vector, or direction of travel of the V2X terminal, a congestion condition of the sidelink radio interface;
        in response to determining that the congestion condition is greater than a threshold congestion, determine a control command for controlling communication over the sidelink radio interface by the V2X terminal to decrease congestion on the sidelink radio interface to be less than the threshold congestion; and
        cause the transceiver to transmit the control command to the V2X terminal.

16. The RAN of claim 15, wherein the one or more indicators comprise a number of active transmitters detected in a geographical area over a predetermined time period.

17. The RAN of claim 15, wherein the control command comprises a command to the V2X terminal to adjust transmission settings to control congestion or collision of communications on V2X spectrum resources.

18. The RAN of claim 15, wherein the one or more processors are further configured to determine the control command for the V2X terminal based on geo-information associated with the V2X terminal and to control the transceiver to transmit the control command in a geo-information transmission message comprising an indication of the geo-information associated with the V2X terminal.

19. A non-transient computer readable medium comprising machine executable instructions arranged, when executed by at least one processor in a terminal for use in a wireless communication system supporting vehicle-to-anything (V2X) communication, to cause the terminal to:
    communicate via an uplink and a downlink radio interface with a base station of the wireless communication system,
    communicate via a sidelink radio interface of the wireless communication system with one or more V2X terminals;
    receive one or more indicators related to the one or more V2X terminals, wherein the one or more indicators comprise at least one of a velocity vector, an acceleration vector, or a direction of travel of the one or more V2X terminals;
    determine, based on the at least one of the velocity vector, acceleration vector, or direction of travel, a congestion condition of the sidelink radio interface; and
    in response to determining that the congestion condition is greater than a threshold congestion, control communication over the sidelink radio interface to control congestion to be less than the threshold congestion or control collision of messages on the sidelink.

20. The non-transient computer readable medium according to claim 19, further comprising instructions to obtain the one or more indicators and causing at least one of the one or more indicators to be transmitted to the base station.

21. A non-transient computer readable medium comprising machine executable instructions arranged, when executed by at least one processor in an apparatus for use in a wireless communication network supporting vehicle-to-anything (V2X) services, to cause the apparatus to:
- communicate via an uplink and a downlink radio interface with a V2X terminal of the wireless communication network, wherein the V2X terminal communicates with other V2X terminals via a V2X sidelink radio interface;
- receive one or more indicators related to the V2X terminal, wherein the one or more indicators comprise at least one of a velocity vector, an acceleration vector, or a direction of travel of the V2X terminal;
- determine, based on the at least one of the velocity vector, acceleration vector, or direction of travel, a congestion condition of a sidelink radio interface;
- in response to determining that the congestion condition is greater than a threshold congestion, determine an adjustment to spectrum resource allocation for the V2X sidelink radio interface for controlling congestion and/or collision of V2X communication over the V2X sidelink radio interface; and
- cause a control command to be transmitted to the V2X terminal based on the determined adjustment.

* * * * *